US011664997B2

(12) United States Patent
Choi

(10) Patent No.: US 11,664,997 B2
(45) Date of Patent: *May 30, 2023

(54) AUTHENTICATION IN UBIQUITOUS ENVIRONMENT

(71) Applicant: Unho Choi, Toronto (CA)

(72) Inventor: Unho Choi, Toronto (CA)

( * ) Notice: Subject to any disclaimer, the term of this patent is extended or adjusted under 35 U.S.C. 154(b) by 232 days.

This patent is subject to a terminal disclaimer.

(21) Appl. No.: 17/221,118

(22) Filed: Apr. 2, 2021

(65) Prior Publication Data

US 2021/0226798 A1 Jul. 22, 2021

Related U.S. Application Data

(60) Continuation of application No. 15/667,024, filed on Aug. 2, 2017, now Pat. No. 11,005,660, which is a
(Continued)

(30) Foreign Application Priority Data

Nov. 17, 2009 (KR) ........................ 10-2009-0110964

(51) Int. Cl.
*H04L 9/32* (2006.01)
*H04L 9/40* (2022.01)
(Continued)

(52) U.S. Cl.
CPC ............ *H04L 9/3231* (2013.01); *G06F 21/32* (2013.01); *G06F 21/33* (2013.01); *G06F 21/34* (2013.01);
(Continued)

(58) Field of Classification Search
CPC . H04L 9/3231; H04L 9/3263; H04L 63/0823; H04L 63/0861; G06F 21/32; G06F 21/34; G06F 21/33
(Continued)

(56) References Cited

U.S. PATENT DOCUMENTS 6,609,198 B1 8/2003 Wood et al.
6,745,327 B1 * 6/2004 Messing ............... H04L 9/3263
713/157
(Continued)

FOREIGN PATENT DOCUMENTS

JP 2008269511 A 11/2008
JP 2012/523734 A 10/2012
(Continued)

OTHER PUBLICATIONS

Biometric Personal Authentication Using DNA Data, NTT Data Technology Corporation, Aug. 2002.
(Continued)

*Primary Examiner* — Teshome Hailu
(74) *Attorney, Agent, or Firm* — United One Law Group LLC; Kongsik Kim; Jhongwoo Peck

(57) ABSTRACT

A method of registering a person as an authorized user of a portable device includes acquiring biometric data or a combination of pieces of biometric data of a person, encrypting the acquired biometric data or the combination of pieces of biometric data, generating a code from the encrypted biometric data or the combination of pieces of biometric data, inserting the code in an extension field of a public key certificate stored in the portable device, generating a private key and a public key that corresponds to the private key, based on the public key certificate, wherein the private key contains the code, and transmitting the public key to a remote entity, thereby enabling the remote entity to register the person as an authorized user of the portable device. The extension field of the public key certificate further contains a code associated with identification information of the person.

21 Claims, 20 Drawing Sheets

Related U.S. Application Data division of application No. 14/693,521, filed on Apr. 22, 2015, now Pat. No. 9,832,019, which is a continuation-in-part of application No. 13/510,464, filed as application No. PCT/KR2010/006698 on Sep. 30, 2010, now Pat. No. 9,037,851.

(51) Int. Cl.
*G06F 21/32* (2013.01)
*G06F 21/34* (2013.01)
*G06F 21/33* (2013.01)

(52) U.S. Cl.
CPC ........ H04L 9/3263 (2013.01); H04L 63/0823 (2013.01); H04L 63/0861 (2013.01)

(58) Field of Classification Search
USPC ........................................................ 713/175
See application file for complete search history.

(56) References Cited

U.S. PATENT DOCUMENTS

| | | |
|---|---|---|
| 7,100,044 B2 | 8/2006 | Watanabe et al. |
| 7,272,723 B1 | 9/2007 | Abbott et al. |
| 9,031,231 B2 | 5/2015 | Asim et al. |
| 9,037,851 B2 | 5/2015 | Choi |
| 9,589,260 B2 | 3/2017 | Choi |
| 9,832,019 B2 | 11/2017 | Choi |
| 2002/0038420 A1 | 3/2002 | Collins et al. |
| 2002/0038818 A1 | 4/2002 | Zingher et al. |
| 2003/0115475 A1* | 6/2003 | Russo .................. H04L 9/3231 713/186 |
| 2003/0195842 A1 | 10/2003 | Reece |
| 2004/0022422 A1 | 2/2004 | Yamauchi et al. |
| 2005/0015596 A1* | 1/2005 | Bowers ............... G06F 21/6245 713/170 |
| 2005/0102522 A1 | 5/2005 | Kanda |
| 2007/0050303 A1* | 3/2007 | Schroeder ............. G07F 7/1016 705/67 |
| 2008/0010983 A1 | 1/2008 | Morgan et al. |
| 2008/0028447 A1 | 1/2008 | O'Malley et al. |
| 2008/0045342 A1 | 2/2008 | Crowder et al. |
| 2008/0065895 A1* | 3/2008 | Liu ..................... H04L 63/0861 713/176 |
| 2008/0091953 A1* | 4/2008 | Bowers ................ H04L 9/0866 713/186 |
| 2008/0126811 A1 | 5/2008 | Chang et al. |
| 2008/0148047 A1 | 6/2008 | Appenzeller et al. |
| 2008/0148059 A1 | 6/2008 | Shapiro |
| 2008/0250246 A1 | 10/2008 | Arditti et al. |
| 2010/0185864 A1 | 7/2010 | Gerdes, Jr. et al. |
| 2010/0223474 A1* | 9/2010 | Bowers .................. G06F 21/34 713/186 |
| 2012/0191491 A1 | 7/2012 | Choi |
| 2012/0278614 A1 | 11/2012 | Choi |
| 2013/0151847 A1 | 6/2013 | Sinha |
| 2014/0040146 A1 | 2/2014 | Fiske |
| 2016/0344559 A1* | 11/2016 | Ma ..................... H04W 12/069 |
| 2017/0013262 A1 | 1/2017 | Jun et al. |
| 2017/0140369 A1 | 5/2017 | Choi |
| 2017/0359180 A1 | 12/2017 | Choi |

FOREIGN PATENT DOCUMENTS

| | | |
|---|---|---|
| KR | 10-2003-0000942 A | 1/2003 |
| KR | 10-2005-0051221 A | 6/2005 |
| KR | 10-20050051221 A | 6/2005 |
| KR | 10-2006-0060236 A | 6/2006 |
| KR | 10-2006-0117631 A | 11/2006 |
| KR | 10-2007-0038308 A | 4/2007 |
| KR | 10-20070038308 A | 4/2007 |
| KR | 10-2008-0036446 A | 4/2008 |
| KR | 10-20080036446 A | 4/2008 |
| KR | 10-2008-0113333 A | 12/2008 |
| KR | 10-20080113333 A | 12/2008 |
| KR | 10-2011-0054352 A | 5/2011 |
| KR | 10-1247914 B1 | 3/2013 |
| WO | 10-2009-140654 A2 | 11/2009 |

OTHER PUBLICATIONS

Biometrics authentication with smartcard. Bechelli et al. eTeleomatica (2002).
European Office Action dated Jul. 24, 2018 in corresponding European Application No. 18167938.2.
European Office Action dated Nov. 6, 2018 in corresponding European Application No. 15889961.7.
HIPAA Compliance and Smartcards Solutions to Privacy and Security Requirements, SmartCard Alliance. Sep. 2003.
How to Support Smart Card Logon for Remote Access VPN Connections. TechNet. Aug. 29, 2006.
International Search Report for PCT/KR2010/006698 (in Korean and English), dated Jun. 23, 2011; ISA/KR.
International Search Report for PCT/KR2010/006699 (in Korean and English), dated Jun. 3, 2011; ISA/KR.
Internet X.509 Public Key infrastructure Qualified Certification Profile, Jan. 2001.
Russian Office Action dated Sep. 26, 2018 (in Russian and English) in corresponding Russian Application No. 2017140260.
SANS Biometric Selection: Body Parts Online. Walker. Jul. 26, 2002.
The OpenVPN Smartcard HOWTO. Acksyn. Apr. 7, 2007.

* cited by examiner

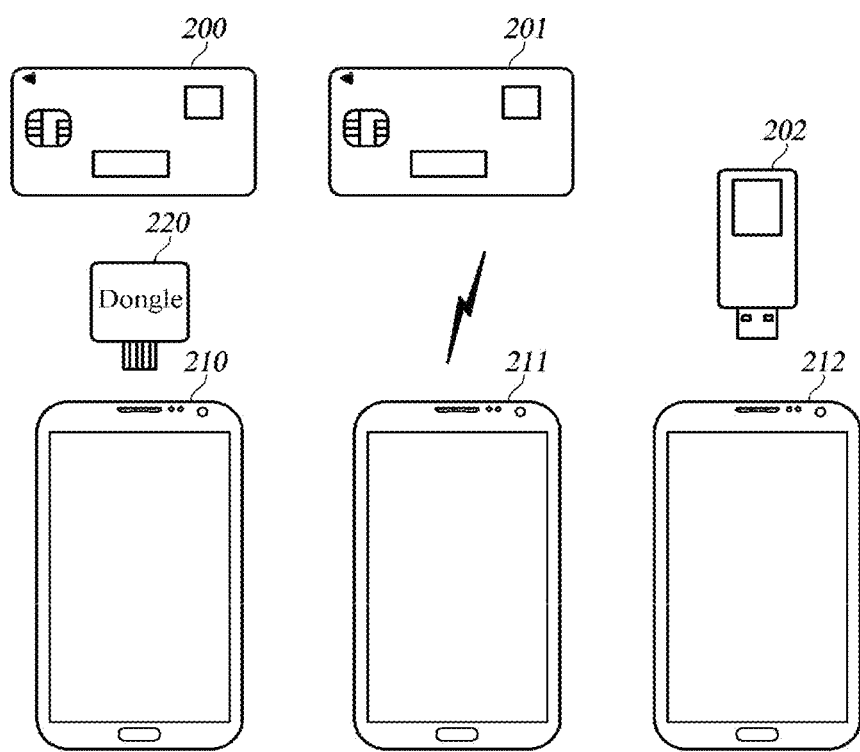
*FIG. 2A*  *FIG. 2B*  *FIG. 2C*

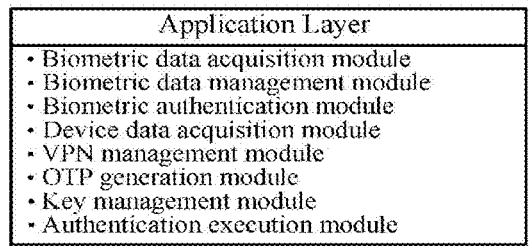
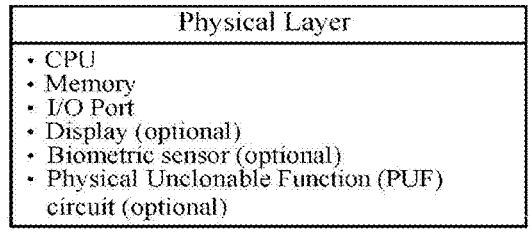
FIG. 3A
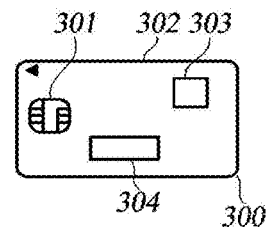
FIG. 3B
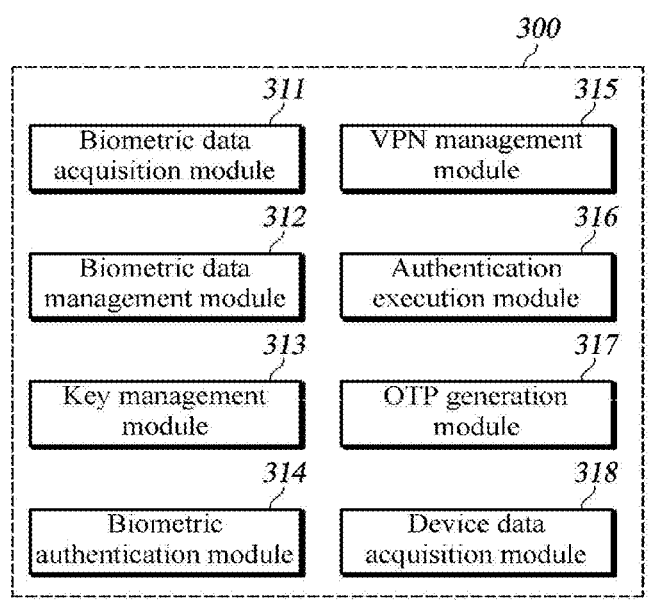
FIG. 3C

< Before user registration >

| Public Key Certificate |
|---|
| Version / Serial Number / Signature algorithm / Hash algorithm / Issuer Name / Validity Period / Public Key |
| Subject Distinguished Name / Subject Public Key Information / Issuer's Signature |
| Extended Validation |
| (Empty) |

< After user registration >

(a) Biometrics (b) Biometrics | UPC/EPC (c) Biometrics | PAN (d) Biometrics | PUF (e) Biometrics | Dynamic Signature (f) Biometrics | Activity feature (g) Biometrics | UPC/EPC | PAN (h) Biometrics | UPC/EPC | PAN | PUF (i) Biometrics | UPC/EPC | PAN | PUF | Dynamic Signature (j) B9E2995B2B7602AE825CE7DE819F10F088419E595A9AA
   - Biometric code / UPC/EPC code / PAN code / PUF code (k) B9E2995B2B7602AE825CE7DE819F10F088419E595A9AAE81919EF58
   - Biometric code / UPC/EPC code / PAN code / PUF code / OTP

*FIG. 6*

| Application Field | | |
|---|---|---|
| Financial and Identification Section | Physical Section | SSO Section | Device user Authentication section |
| • Financial Data<br>• E-Wallet<br>• Digital Money<br>• Cryptographic hash functions address<br>• Coupon<br>• National ID<br>• Driver License<br>• Medical Information<br>• Patients Record<br>• e-Voting<br>• Pension<br>• Unique Identification Information etc. | • Physical ID Access based on location | • Smart card for SSO<br>• Smart Phone for SSO<br>• Smart card SSO for Cloud<br>• Smart Phone for Cloud etc. | • Device user Authentication in IoT device<br>• Device user Authentication in Centralized controller<br>• Device user Authentication in IoT Service Server<br>• Device user Authentication in IoT device Vendor |

*FIG. 13*

AUTHENTICATION IN UBIQUITOUS ENVIRONMENT

CROSS-REFERENCE TO RELATED APPLICATIONS

This application is a Continuation of U.S. patent application Ser. No. 15/667,024 filed on Aug. 2, 2017, which is a Division of U.S. patent application Ser. No. 14/693,521 filed on Apr. 22, 2015, now issued as U.S. Pat. No. 9,832,019, which is a Continuation-in-part of U.S. patent application Ser. No. 13/510,464 filed on May 17, 2012, now issued as U.S. Pat. No. 9,037,851, which is National Stage Entry of PCT/KR2010/006698 filed on Sep. 30, 2010, which claims priority to Korean Patent Application No. 10-2009-0110964 filed on Nov. 17, 2009. The aforementioned applications are incorporated herein by reference in their entireties.

TECHNICAL FIELD

The present disclosure relates to an authentication of a user and an authentication of an IoT (Internet of Things) device in a ubiquitous environment, including online and offline authentications.

BACKGROUND

The statements in this section merely provide background information related to the present disclosure and may not necessarily constitute prior art.

Applications of the Internet of Things (IoT) are being discussed across the overall industry. For example, the application of the IoT is attempted in a remote management and control a facility that is hard to access, such as a dam, a nuclear power plant, and the like, and a traffic control system, as well as a personal device, such as a smart TV, a robot cleaner, a car navigation, and the like, and various remote services provided by a cloud service. However, an IoT device and an IoT system having a communication function and a function of autonomously obtaining and processing data are subjected to a cyber attack due to an unclear relationship between a subject of usage and an owner thereof.

In particular, the IoT devices currently constituting an IoT network generally have a simple computing function and a vulnerable security, and hence they are in a state of being vulnerable to an attack from outside. Due to the characteristics of the IoT network, the security vulnerability in a specific area and a cyber attack aiming at this vulnerability may cause an adverse effect that may affect other industrial areas.

As it is impossible to separately install and drive security software in the IoT device that has a simple communication function, an additional effort is needed to embed a security hardware module in the IoT device, to apply a security solution to the entire system, or the like. Examples of the security problem in the IoT include a situation where a malicious code is infected in the IoT device or network so that important information is leaked or tampered to cause a system failure, and an attacker freely controls the IoT device or network in a remote location. In particular, an access of a terminal infected by a malicious code to the network may cause a serious damage to the network. For example, a situation may happen where an automated vehicle, an electric vehicle, or a smart vehicle is remotely controlled to cause an accident, a medical device in a hospital is malfunctioned to threat the life of a patient.

In the IoT network, the integrity of the IoT device should be ensured, it should be clearly known where or not a reliable IoT device is connected to the network, and it should be trusted whether or not a legal user accesses a terminal or the network.

In the conventional information security-related system, an illegal user may acquire personal information, password, and biometric data of a legal user, which is used for hacking into the network. For another example, as personal authentication information is not practically contained in a public key certificate issued by a certification authority, there is vulnerability that a third party can steal the public key certificate and the certificate password to illegally use them. In addition, if a person remotely accesses a business system of a company or a government agency by using a legal terminal with stolen authentication information such as ID, password, or biometric data of a legal user, he or she can freely use the business system without any interruption. It is a typical example of the security problem that, if one has an electronic ID card including an IC chip of an employee of a company, which is picked up on a street, for example, he or she can appropriate the picture or the like and use it at a gate of the company as if he or she is an authorized user. Further, a hacking case is reported in the press, where ID, password, biometric data, token, OTP, and PKI certificate are separately used without consolidating them for multi-factor authentication, and a hacker modifies and tampers them in the middle to hack into a network.

SUMMARY

According to some embodiments of the present disclosure, encrypted biometric data, which is encrypted based on a public key certificate, is stored in advance in a device of a user (for example, a smartcard, a communication terminal, or the like), and a user authentication (first user authentication) is performed through a biometric matching in the device. Further, a public key certificate matching the encrypted biometric data is used to perform a user authentication (second user authentication) for a transaction authorization in a service providing server. Moreover, according to some embodiments of the present disclosure, one time password, keystroke, dynamic signature, location information, and the like are employed as additional authentication factors to tighten the security of the first and second user authentications. In addition, according to some embodiments of the present disclosure, an authentication mechanism including the first user authentication and the second user authentication is applied to control an access to an IoT device.

According to some embodiments of the present disclosure, a method of registering a user in an authentication management system based on a public key certificate, which is performed by a portable device of the user, includes encrypting biometric data or a combination of pieces of biometric data of the user by using an encryption algorithm defined in the public key certificate, storing encrypted biometric data or encrypted combination of the pieces of biometric data in the portable device, tokenizing the encrypted biometric data or the encrypted combination of the pieces of biometric data to generate a biometric code, generating a pair of keys including a private key and a public key by inserting a verification code containing at least the biometric code in an extension field of the public key certificate, transmitting the public key to a remote entity, and requesting a registration of the user.

In some embodiments, a field of the public key certificate includes, in addition to the biometric code, at least one of a first additional code derived from unique identification information or identity data assigned to the portable device, a second addition code derived from location information indicating a position where the authentication of the user is requested, a third additional code derived from unique identity data assigned to the user, a fourth additional code derived from characteristic information indicating behavior characteristics of the user, or a fifth additional code derived from device identity data assigned to an IoT device.

According to some embodiments of the present disclosure, a method of authenticating a user in an authentication management system based on a public key certificate, which is performed by a portable device of the user, which stores a private key in which a verification code including a biometric code is inserted and encrypted biometric data or an encrypted combination of pieces of biometric data from which the biometric code is derived, includes acquiring biometric data or a combination of pieces of biometric data of the user, comparing the biometric data or the combination of pieces of biometric data of the user with at least one of the encrypted biometric data or the encrypted combination of pieces of biometric data stored in the portable device or the biometric code, transmitting, when the biometric data or the combination of pieces of biometric data of the user matches the at least one of the encrypted biometric data or the encrypted combination of pieces of biometric data, authentication information including the verification code inserted in the private key to a remote entity, and requesting an authentication of the user.

According to some embodiments of the present disclosure, a method of managing an authentication of a user in an authentication management system based on a public key certificate, which is performed by a remote entity connected to a portable device of the user via a network, includes receiving, from the portable device, a public key corresponding to a private key in which a verification code including a biometric code derived from biometric data or a combination of pieces of biometric data of the user is inserted, performing a registration of the user based on the public key, receiving, from the portable device, authentication information including the verification code inserted in the private key, verifying the authentication information based on the public key, and performing the authentication of the user based on a result of the verifying.

According to some embodiments of the present disclosure, a method of managing an authentication of a user in an authentication management system based on a public key certificate, which is performed by a public terminal configured to provide a predetermined service and a service providing server configured to manage the public terminal, includes receiving including the service providing server receiving, from a portable device of a user, a public key corresponding to a private key in which a verification code including a biometric code derived from biometric data or a combination of pieces of biometric data of the user is inserted, performing including the service providing server performing a registration of the user based on the public key, receiving including the public terminal receiving, from the portable device, authentication information including the verification code inserted in the private key, requesting including the public terminal requesting the service providing server to perform a verification of the authentication information based on the public key, performing including the public terminal performing the authentication of the user based on a result of the verification, and providing including the public terminal providing, when the authentication of the user is successful, the predetermined service.

According to some embodiments of the present disclosure, a more tightened service authenticating function is provided. The biometric data is coded or tokened and inserted in the extension field of the public key certificate, thus preventing tampering of the encrypted biometric data or the electronic signature stored in a smartcard (or communication terminal) by using the public key certificate (i.e., biometric certificate). In addition, various embodiments of the present disclosure can be applied to an accounting system, an electronic payment system, and electronic resident card, passport, pension, insurance, transportation card, electronic election, electronic wallet, and coupon issued by the government, a public institution, and a financial institution, and the like. In this case, even when a third party knows simple personal information card information, biometric data, or certificate information of a specific user, an illegal use of those pieces of information by the third party can be prevented.

According to some embodiments of the present disclosure, an information security for a remote connection of a work system can be tightened.

BRIEF DESCRIPTION OF DRAWINGS

FIGS. 2A to 2C are schematic diagrams for instantiating communication methods between a communication terminal and a smartcard according to some embodiments of the present disclosure.

FIG. 3A is a schematic diagram for instantiating a hierarchical structure of a smartcard according to some embodiments of the present disclosure.

FIG. 3B is a schematic diagram for instantiating a physical structure of a smartcard according to some embodiments of the present disclosure.

FIG. 3C is a schematic diagram for instantiating a functional structure of a smartcard according to some embodiments of the present disclosure.

FIG. 6 is a schematic diagram of an exemplary format of a code stored in an EV domain of a public key/private key shown in FIG. 5B and an exemplary format of authentication information transmitted from a smartcard.

FIG. 13 is a table of an exemplary application field to which the embodiments of the present disclosure can be applied.

DETAILED DESCRIPTION

Figure 1A:
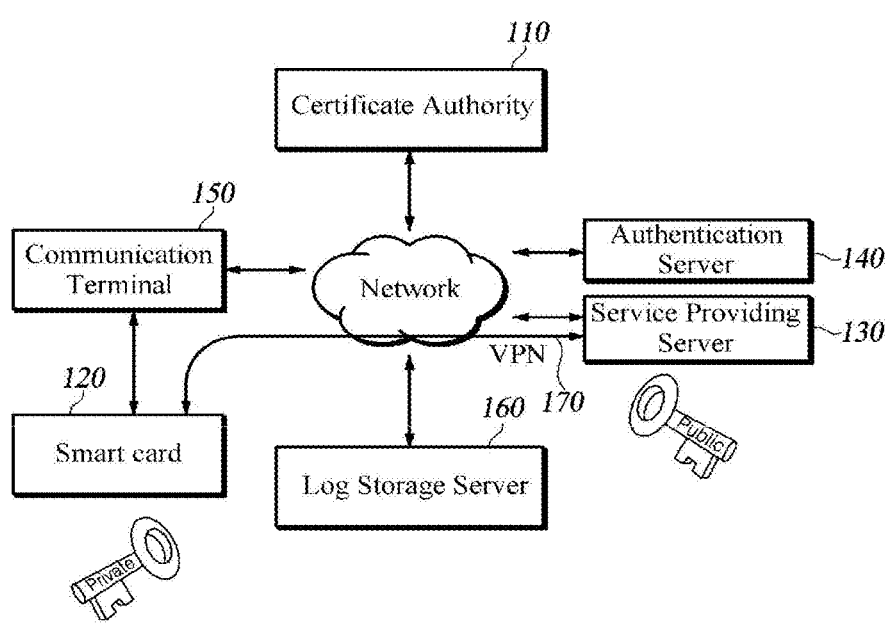
FIG. 1A is a schematic diagram of a system for managing a user authentication in a ubiquitous environment according to some embodiments of the present disclosure.

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, in describing the components of the present disclosure, terms like first, second, A, B, (a), and (b) are used. These are solely for the purpose of differentiating one component from another, and one of ordinary skill would understand the terms are not to imply or suggest the substances, the order or sequence of the components.

FIG. 1A is a schematic diagram of a user authentication management system in a ubiquitous environment according to some embodiments of the present disclosure.

Referring to FIG. 1A, the user authentication management system includes a certification authority (CA) 110, a smartcard 120, a service providing server 130, an authentication server 140, a communication terminal 150, and a log storage server 160.

The certification authority 110 issues a public key certificate containing information on a certification authority (version, expiration date, algorithm, issuing institution, and the like of a certificate). In a process of registering a user, the public key certificate is converted into a public key certificate that matches biometric data of the user. That is, the public key certificate is used for generating a public key/private key in which a code that matches the biometric data of the user is inserted. In some embodiments, the public key certificate is a public key infrastructure (PKI)-based certificate or private certificate. The public key certificate is generally issued to a user from a server of the certification authority (CA) 110; however, in some cases, it is pre-installed in a safe area (e.g., IC chip, secure element (SE), TEE, OS, CPU, memory, cloud SE, and the like) of a communication terminal or a smartcard at the time of designing or manufacturing a product.

The smartcard 120 stores a private key, encrypted biometric data to be compared with sensed biometric data, and other pieces of information in a built-in biometric sensor, an IC chip, a memory, or the like. In addition, a biometric code generated by coding (or tokening) the encrypted biometric data is inserted in the private key.

The smartcard 120 encrypts the biometric data of the user based on the public key certificate, and codes (or tokens) the encrypted biometric data, to generate the biometric code. The smartcard 120 generates a pair of keys (i.e., a public key and a private key) by inserting the generated biometric code in the public key certificate. The biometric code or the private key is used for verifying integrity and non-repudiation of the encrypted biometric data, which can be used as a bio signature. The biometric code generated in the above manner can be used as a token or can be used as a combination with an OTP (One Time Password; also referred to as "dynamic code"). The biometric data coded and inserted in the public key certificate contains finger print information, blood vessel information, voice information, iris information, hand writing information, face information, heartbeat, and the like. The smartcard 120 transmits the public key to the service providing server 130 or the authentication server 140, and the service providing server and the authentication server uses the received public key in an authentication process later on.

In some embodiments, the smartcard 120 merges biometric codes respectively coded from a plurality of pieces of different biometric data of the user, and inserts the merged biometric codes in a single certificate. For example, a combination of different types of biometric data, such as finger print+iris, face+voice, an heartbeat+iris and a combination of similar types of biometric data, such as finger print 1 (thumb)+finger print 2 (index finger) and iris 1 (right)+iris 2 (left) can be used. When a combination of a plurality of pieces of biometric data is used, an order of inputting the biometric data (e.g., finger print 1→finger print 2→finger print 3 or finger print→iris) can be added as an additional authentication element. In some embodiments, the smartcard inserts different pieces of biometric data or different combinations of pieces of biometric data of the user in different public key certificates. In some embodiments, codes extracted from a physical signature (hand-written signature or dynamic signature) or a key stroke of the user, an input method of the biometric data, and the like are added to the certificate as an additional authentication element. In this case, time, speed, direction, pressure, location information, and the like, which are behavior characteristics (or behavior pattern elements) when the user inputs the physical signature or a key stroke to input a word or a number having a certain meaning, can be considered as the additional authentication element.

Further, in some embodiments, the smartcard 120 is configured to generate a pair of keys by concatenating one or more of additional codes, as an additional purpose or authentication element, with the biometric code. For example, at least one of an additional code derived from unique identity data assigned to the smartcard 120, an addition code derived from location information indicating a position where the authentication (or registration) of the user is requested, an additional code derived from unique identity data assigned to the user, an additional code derived from characteristic information indicating behavior characteristics of the user, or an additional code derived from device identity data assigned to an IoT device can be concatenated with the biometric code.

In addition, when generating the pair of keys (public key/private key) by inserting the biometric code in the public key certificate, the smartcard 120 is configured to generate a plurality of biometric codes from different pieces of biometric data or a combination of pieces of biometric data, and to insert the plurality of biometric codes in an extension field of the public key certificate in a separated manner. The above-mentioned one or more additional codes can be concatenated with each of the biometric codes. Consequently, the private key and the public key include a plurality of biometric code or a plurality of biometric code with the additional code concatenated. In this case, the plurality of biometric codes can be used for different purposes from each other. For example, any one of the plurality of biometric codes is designated to be used for performing a normal user authentication of the private key. The rest of the biometric codes can be designated to be used for notifying a use of the private key by coercion from a third party, for requesting a cancelation of a user registration performed based on transmitted public key, for requesting an initialization of an authentication management system that is managed by a remote entity (e.g., a service providing server, an authentication server, a centralized controller, or the like), and the like.

The communication terminal 150 is connected to the smartcard 120 in a wired or wireless manner, establishes a virtual private network (VPN) between the smartcard 120 and the service providing server 130 in response to a tunneling start signal received from the smartcard 120, receives authentication information based on a registered certificate from the smartcard 120, and transmits the authentication information to the service providing server 130. In addition, the communication terminal 150 can be used as means for acquiring biometric data and dynamic signature of the user, the identity data of the IoT device, and the like required in a user registration procedure or a user authentication procedure for generating the private key/public key of the smartcard 120. In some embodiments, the communication terminal 150 includes one or more biometric sensors, a touch screen, a camera, a microphone, and the like, or is connected thereto. The communication terminal 150 includes a public service terminal (ATM, Kiosk, POS, and the like), as well as a private communication terminal (e.g., a mobile phone, a tablet PC, a desktop computer, a set-up box, and the like), and should be understood to cover all devices that can communicate with a remote entity in the communication network.

The authentication server verifies the authentication information transmitted from the smartcard (or communication terminal) by using the public key acquired in the user registration procedure. For example, the authentication server receives the public key generated by the smartcard (or communication terminal) by using the public key certificate in the user registration procedure, and in the user authentication procedure later on, verifies the authentication information transmitted from the smartcard (or communication terminal) based on the public key in response to a request from the service providing server.

The service providing server 130 is a server of a service provider who provides an authenticated user with various services including a bank/credit card service, a payment service, an e-government service, a cloud service, an IoT device-linked service, an emergency service, and the like. The service providing server 130 authenticates the user based on the authentication information received from the smartcard (or communication terminal). For example, the service providing server requests the authentication server to verify the authentication information, and authenticates the user based on a result of the verification. In some embodiments, the service providing server and the authentication server are implemented as functional constituent elements in a single server.

The log storage server 160 records log data indicating a connection history of the smartcard 120 to the service providing server via the communication terminal 150 and an authentication result. Further, when the service providing server 130 accesses the certification authority, a card company server, or the like to reconfirm the information on the user, the log storage server 160 records and stores an access try thereto and a result of the access try. Moreover, the log storage server 160 monitors a VPN 170 established between the smartcard 120 and the service providing server 130, and takes a role of a VPN firewall to deny an access of an illegal user. In addition, the log storage server confirms whether or not a user is a legal user of an electronic wallet, and issues or prints an electronic receipt including the biometric code to the user.

The data stored in the log storage server 160 can be used in a digital forensic. For example, the log data can be used as confirmation/evidential material for a behavior of the user later on. For example, the authentication information transmitted from the smartcard to the service providing server 130 contains handwriting signature information of the user, and by storing such handwriting signature information with the log data, the physical signature information can be displayed in a printed form or in an electronic form on an electronic receipt or an invoice later on.

Figure 1B:
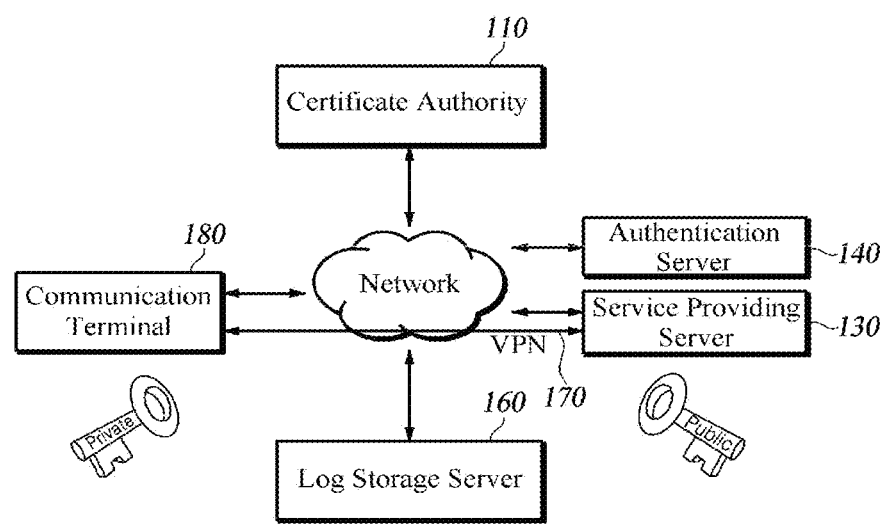
FIG. 1B is a schematic diagram of a system for managing an identity in a ubiquitous environment according to some embodiments of the present disclosure.

FIG. 1B is a schematic diagram of a system for managing an identity in a ubiquitous environment according to some embodiments of the present disclosure.

The smartcard 120 and the communication terminal 150 are separately provided in FIG. 1A; however, as shown in FIG. 1 B, according to some embodiments of the present disclosure, the function of the smartcard 120 is incorporated in the communication terminal 150. That is, the certificate that matches the biometric data of the user can be stored and managed in a secure element (SE; secure memory and execution environment), a CPU, an OS, or the like in the communication terminal 150. The secure element in the communication terminal 150 can be implemented in, for example, an IC chip such as a SIM, a USIM, a microSD card, an NFC card, and the like.

The communication terminal 150 is capable of performing the user authentication procedure by using a certificate matched with the biometric data of the user without being linked with the smartcard. Further, the communication terminal includes various types of biometric sensors for sensing the biometric data, and includes appropriate input/sensing means to obtain device information from an IoT device or is linked with an external device including such means. The communication terminal 150, although it is not particularly noted, has features corresponding to various features given to functions or operations of the smartcard described across overall embodiments of the present disclosure.

In some embodiments, the communication terminal shown in FIG. 1B includes a personal communication terminal (e.g., a mobile phone, a wearable device such as a watch, glasses, a ring or the like, a tablet PC, a desktop computer, a set-up box, and the like), and should be understood to cover all devices that can communicate with a remote entity in the communication network.

FIGS. 2A to 2C are schematic diagrams for instantiating communication methods between a communication terminal and a smartcard according to some embodiments of the present disclosure. In FIGS. 2A to 2C, it is assumed that the communication terminal shown in FIG. 1 is implemented with a mobile terminal such as a smartphone.

According to some embodiments, as shown in FIG. 2A, the smartcard is configured to communicate with the communication terminal via a pocket-sized dongle. The dongle is configured to transmit or receive information to or from the smartcard in a contact or contactless manner. The dongle is, for example, plugged in an audio jack or a micro USB terminal of the smartphone. With this configuration, the user can connect the smartphone and the communication terminal in a communicating manner by plugging the dongle in the smartphone and tagging or swiping the smartcard to the dongle. In some embodiments, the dongle provides a hardware-based encryption scheme for security purposes.

According to some embodiments, as shown in FIG. 2B, the smartcard is directly connected to the communication terminal in a communicating manner via a wireless communication scheme (e.g., NFC, RFID, and the like).

According to some embodiments, as shown in FIG. 2C, the smartcard is implemented as a USB dongle type that is directly plugged in the communication terminal.

FIG. 3A is a schematic diagram for instantiating a hierarchical structure of a smartcard according to some embodiments of the present disclosure.

A physical hierarchy of the smartcard includes a CPU, a memory, and an I/O port. The memory includes any one of a read only memory (ROM), a random-access memory (RAM), an electrically erasable programmable read only memory (EEPROM), an erasable programmable ROM (EPROM), a flash EEPROM, a Ferro electrical RAM (Fe-RAM), and a combination thereof. Selectively, the smartcard further includes at least one of a display or one or more biometric sensors. Selectively, the smartcard further includes a physical unclonable function (PUF) circuit.

An application hierarchy of the smartcard relates to a functional constituent element of an OS or an applet of the smartcard, which is classified into, for example, a biometric-information acquisition module, a biometric-information management module, a biometric authentication module, a device-information acquisition module, a VPN management module, an OTP generation module, a key management module, and an authentication execution module. Each functional constituent element is described later with reference to FIG. 3C.

FIG. 3B is a schematic diagram for instantiating a physical structure of a smartcard according to some embodiments of the present disclosure.

As shown in FIG. 3B, in some embodiments, a smartcard 300 includes an IC chip 301 including CPU/memory/OS/PUF circuits and the like, at least one biometric sensor 303, and a display 304.

The smartcard 300 shown in FIG. 3B is configured to sense at least a part of one or more pieces of biometric data required in the user registration procedure and the user authentication procedure by using the built-in biometric sensor 303. The biometric sensor 303 includes a finger print recognition sensor, an iris recognition sensor, a voice recognition sensor, a blood-vessel recognition sensor, a handwriting recognition sensor, a facial sensor, a heartbeat sensor, a dynamic signature sensor, and the like. In particular, the dynamic signature sensor is configured to be coupled to the display 304 including a touch screen.

The smartcard 300 is configured to display a One Time Password (OTP) generated by an OTP generation module included in the OS/CPU/memory and the like of the IC chip 301. The smartcard 300 is further configured to display following information on the display 304:
  a result of biometric matching;
  a notification that a private key corresponding to the input biometric data or a combination of pieces of biometric data does not exist;
  a list of a plurality of private keys corresponding to the input biometric data or a combination of pieces of biometric data;
  a usage of the private key corresponding to the input biometric data or a combination of pieces of biometric data; and
  a registered dynamic signature.

FIG. 3C is a schematic diagram for instantiating a functional structure of the smartcard according to some embodiments of the present disclosure.

Each constituent element of the smartcard shown in FIG. 3C is a functional element that is logically divided or a functional constituent element that is coupled with a physical constituent element. That is, each constituent element corresponds to a functional constituent element to achieve the technical idea of the present disclosure, and hence even if each constituent element performs its function in an integrated manner or in a separated manner, it should be construed as being within the scope of the present disclosure so long as the function performed by the functional configuration of the present disclosure is achieved. Further, it is a matter of course that, if a constituent element performs the same or similar function, it should be construed as being within the scope of the present disclosure regardless of the name.

As shown in FIG. 3C, functional elements of the smartcard can be divided into a biometric-information acquisition module 311, a biometric-information management module 312, a key management module 313, a biometric authentication module 314, a VPN management module 315, an authentication execution module 316, an OTP generation module, and a device-information acquisition module 318.

The biometric-information acquisition module 311 acquires the biometric data of the user in the user registration procedure and in the user authentication procedure. In some embodiments, the biometric-information acquisition module 311 acquires the biometric data of the user from the biometric sensor embedded in the smartcard 300. In some embodiments, the biometric-information acquisition module 311 acquires biometric data sensed from a communication terminal or other external devices (e.g., an ATM, a Kiosk, a POS, a CARD reader, and the like) including a biometric sensor.

The biometric-information management module 312 encrypts the biometric data acquired by the biometric-information acquisition module 311 in the user registration procedure, based on the public key certificate, and stores and manages the encrypted biometric data in the smartcard (e.g., a memory embedded in the IC chip of the smartcard, a biometric sensor embedded in the smartcard, and the like). In some embodiments, the biometric-information management module 312 encrypts and stores a plurality of pieces of biometric data of a subscriber. For example, finger print information of each finger of the subscriber is stored in the smartcard, and iris information of eyes of the subscriber is stored in the smartcard. Further, various combinations of pieces of biometric data of the subscriber, such as finger print+iris, iris+face, and the like, are stored in the smartcard.

The key management module 313 generates a biometric code by coding (or tokening) the encrypted biometric data based on the public key certificate, and generates a pair of keys (private key and public key) in which the biometric code is inserted, by inserting the generated biometric code in the public key certificate. The key management module 313 installs or stores the generated private key in a memory, a CPU, an OS, an application, or the like embedded in the IC chip of the smartcard, and transmits the generated public key to the authentication server (or service providing server). In some embodiments, the key management module 313 is configured to generate a pair of keys by concatenating one or more of additional codes, as an additional purpose or authentication element, with the biometric code. Hereinafter, in order to avoid a confusion, the public key certificate used for generating the pair of keys, i.e., the public key certificate in which the biometric code is not inserted, is referred to as a "blank certificate".

In some embodiments, the blank certificate is installed or stored in the smartcard in advance. That is, government/ manufacturer/financial agent/service provider installs or stores at least one blank certificate in the IC chip, the OS, the CPU, the memory, or the like of the smartcard in advance at the stage of manufacturing/issuing the smartcard. In this case, it is preferred to allow only an institute that issues the smartcard 120 to store the certificate in the smartcard. In some embodiments, the smartcard is issued with a blank certificate from a server of the certification authority (CA) via the communication terminal. In some embodiments, the key management module 313 copies the blank certificate stored in a computer or a communication terminal. For example, the blank certificate has limited expiration date or usage according to type or purpose of a service, service providing period, reliability of a user, and the like. In some embodiments, the expiration date of the blank certificate is same as that of the smartcard. Further, in some embodiments, a plurality of blank certificates has different expiration dates from each other and different usages from each other.

The biometric authentication module 314 compares the biometric data acquired by the biometric-information acquisition module 311 with the encrypted biometric data stored in the smartcard. Further, the biometric authentication module 314 compares the biometric data acquired by the biometric-information acquisition module 311 with the biometric code inserted in the public key certificate stored in the smartcard. That is, the biometric authentication module 314 determines whether or not the biometric data matches the encrypted biometric data and the biometric code stored in the smartcard. In some embodiments, the biometric authentication module 314 compares the acquired biometric data with either one of the encrypted biometric data or the biometric code stored in the smartcard.

The VPN management module 315 establishes and manages a VPN with a remote entity such as the service providing server, and provides an end-to-end encryption and a safe transmission section. For example, when it is determined that the acquired biometric data matches the encrypted biometric data and the biometric code stored in the smartcard by the biometric authentication module 314, the VPN management module 315 transmits a tunneling start signal for establishing a VPN with the service providing server to the communication terminal. The tunneling start signal contains a destination URL for establishing the VPN. The communication terminal includes a public service terminal (ATM, Kiosk, POS, and the like), as well as a private communication terminal (e.g., a mobile phone, a tablet PC, a desktop computer, a set-up box, and the like), and should be understood to cover all devices that can communicate with a remote entity in the communication network.

When the biometric-information management module 312 manages a plurality of pieces of biometric data, the VPN management module 315 is configured to transmit the tunneling start signal by designating different destination URLs for establishing the VPN depending on the biometric data that matches the live biometric data inputted via the biometric-information acquisition module 311 among a plurality of pieces of stored biometric data. The destination URL is a server of a service provider who provides an authenticated user with various services including a bank/ credit card service, a payment service, an e-government service, a cloud service, an IoT device-linked service, an emergency service, and the like. Such an URL can be designated at a stage of manufacturing the smartcard, a stage of issuing the certificate, or a stage of generating the private key/public key. For example, the URL is inserted in the public key certificate stored in the smartcard in advance, or stored in a storage area same as an area where the public key certificate is stored. In some embodiments, the storage area is an area in the IC chip where a data modification is not allowed. In some embodiments, when additionally issuing a new public key certificate at the smartcard, a URL related to the public key certificate issued is received together, or a public key certificate in which the related URL is inserted is issued. In some embodiments, such a public key certificate is stored in an area in the IC chip where a data modification is allowed. In some embodiments, the URL is inserted in the private key/public key in a form of being incorporated in the biometric code.

In addition, specific biometric data among a plurality of pieces of biometric data or a specific combination among a plurality of combinations of pieces of biometric data (an order may be assigned) can be used for notifying an emergency situation of the user. For example, the tunneling start signal corresponding to the specific biometric data is configured to cause the VPN to be established to a predetermined URL (e.g., a server of the police agency and a safety management server) to notify the emergency situation of the user. With this configuration, when a user has to coercively perform a user authentication procedure using the smartcard 120 by a threat of a third party, the user can transmit an emergency situation signal to the server of the police agency without being detected by the third party, by using a predetermined specific biometric data among a plurality of registered pieces of biometric data. Such an emergency situation signal can be used for handling with insurance later on or an evidence against a lawsuit.

Upon establishing a communication tunnel to the service providing server, the authentication processing module 316 transmits the authentication information based on the private key that is managed by the key management module 313 to the corresponding service providing server, thus authenticating the user of the smartcard 120 as a legal user. The authentication information is described later with reference to FIG. 6.

In some embodiments, the smartcard further includes the OTP generation module 317. The OTP generation module 317 generates a one time password (OTP) by a method predetermined by an issuing organization of the smartcard 120. In some embodiments, the OTP generated by the OTP generation module 317 is displayed on a display of the smartcard such that the user of the smartcard 120 can see the OTP, and the OTP generation module 317 is configured to transmit an OTP inputted by the user to the authentication processing module 316. In some embodiments, the one time password generated by the OTP generation module 317 is directly transmitted to the authentication processing module 316 without being displayed on the display. The OTP transmitted to the authentication processing module 316 is combined with the authentication information based on the certificate and transmitted to a target terminal. With this process, the smartcard 120 can be verified (authenticated) that it has been issued by a legal issuing organization. It should be noted that, in a conventional technology in the corresponding technical field, an OTP device has been used separately from the smartcard.

In some embodiments, the smartcard 120 further includes a device-information acquisition module 318. The device-information acquisition module 318 acquires identity data of an IoT device. The identity data of the IoT device is unique identity data assigned to the IoT device at the time of manufacturing, distributing, or purchasing the IoT device, and details thereof is described later with reference to FIG. 6. The device-information acquisition module 318 is configured to receive the identity data of the IoT device from a sensor embedded in the smartcard 120 or the communication terminal 150 or other external device (e.g., an ATM, a Kiosk, a POS, a CARD reader, or the like) including at least one sensor.

Figure 4A:
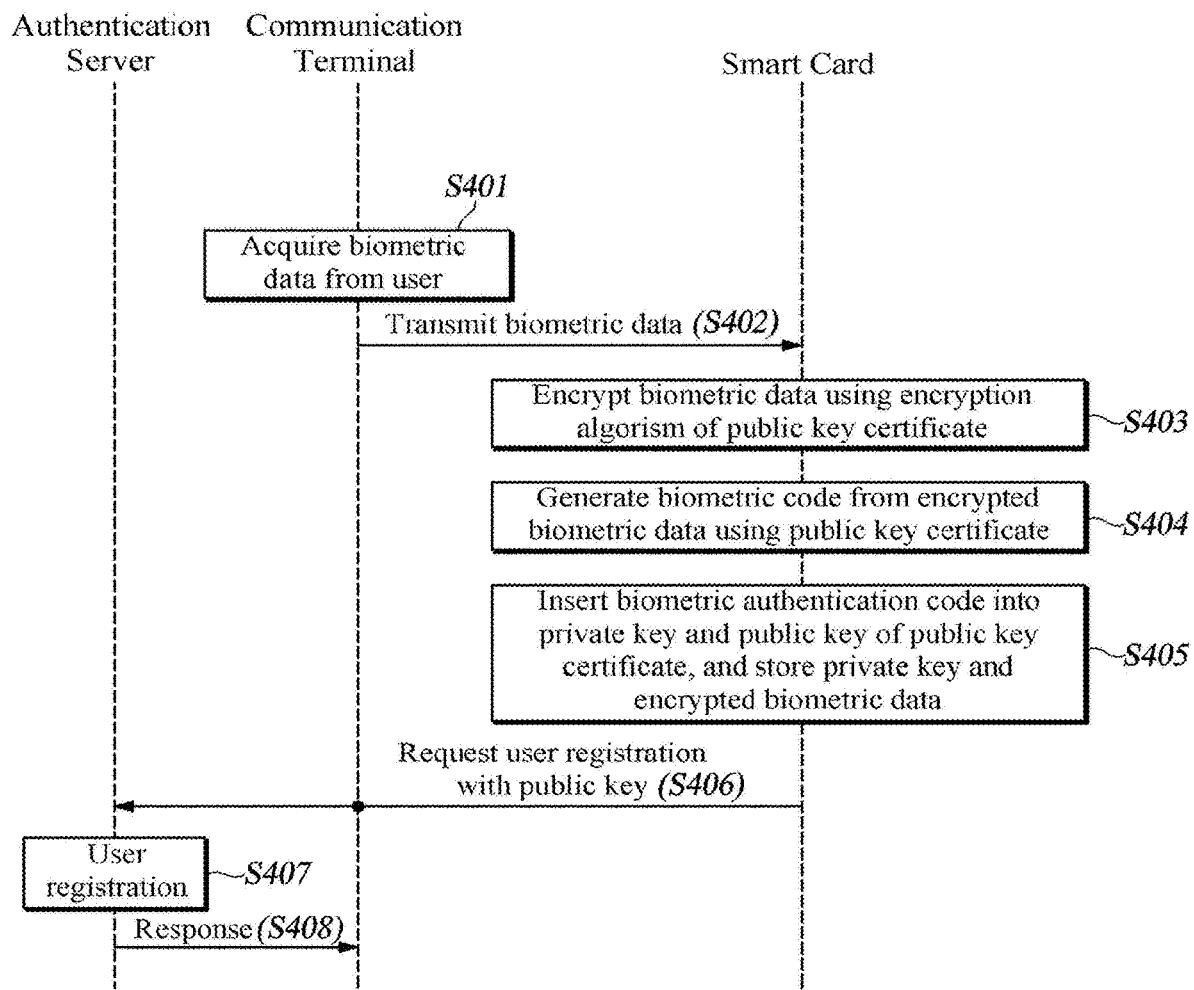
FIG. 4A is a flowchart of a user registration procedure according to some embodiments of the present disclosure.

FIG. 4A is a flowchart of a user registration procedure according to some embodiments of the present disclosure. The user registration procedure shown in FIG. 4A is suitable for a user authentication system having the configuration shown in FIG. 1A. In the example shown in FIG. 4A, it is assumed that the public key certificate is stored in advance in the smartcard (e.g., at the time of manufacturing or issuing the smartcard); however, it is also possible to receive a new public key certificate from a server of the certification authority (CA).

Firstly, the communication terminal acquires the biometric data of the user, and transmits the acquired biometric data of the user to the smartcard (Steps S401 and S402). When acquiring the biometric data, a biometric sensor embedded in the communication terminal or an external biometric sensor connected to the communication terminal is used. Unlike the example shown in FIG. 4A, in some embodiments, the smartcard directly acquires the biometric data of the user by using the embedded biometric sensor.

The smartcard, which has acquired the biometric data of the user, encrypts the biometric data of the user based on a pre-stored or preexisting public key certificate (Step S403). That is, the smartcard encrypts the biometric data according to an encryption algorithm defined in the public key certificate.

Further, the smartcard generates a code value by coding or tokening the encrypted biometric data (Step S404). A coding or tokening algorithm is embedded in an application of the smartcard, or defined in the public key certificate. For example, in some embodiments, a message-digest algorithm or the like defined in the public key certificate is used in coding or tokening process. The code value is information obtained by coding the biometric data of the user based on the public key certificate, and hence it can be referred to as "a biometric code" "a biometric digital signature".

Subsequently, the smartcard generates a pair of keys (a public key and a private key) by inserting the biometric code in the EV (Extended Validation) domain of the public key certificate. That is, the biometric code is inserted in the generated private key and public key. The private key is stored in the smartcard together with the encrypted biometric data, to be used in the user authentication procedure later on (Step S405). Although it is not shown in FIG. 4A, various additional codes can be concatenated with the above-mentioned biometric code as an additional authentication element, which are generated in a manner same as or similar to that for the biometric code. For example, in a domain of the public key certificate, at least one of an additional code derived from unique identity data assigned to the portable device, an additional code derived from location information indicating a position where the authentication of the user is requested, an additional code derived from unique identity data assigned to the user, an additional code derived from characteristic information indicating behavior characteristics of the user, or an additional code derived from device identity data assigned to the IoT device can be inserted, as well as the biometric code. The additional codes are described later with reference to FIG. 6.

The smartcard transmits the public key to the authentication server (or service providing server) via the communication terminal, to request for a user registration (Step S406). The public key can be transmitted by using a virtual private network (VPN). The authentication server registers the user, and manages the public key in a separate safe DB (Steps S407 to S408).

Figure 4B:
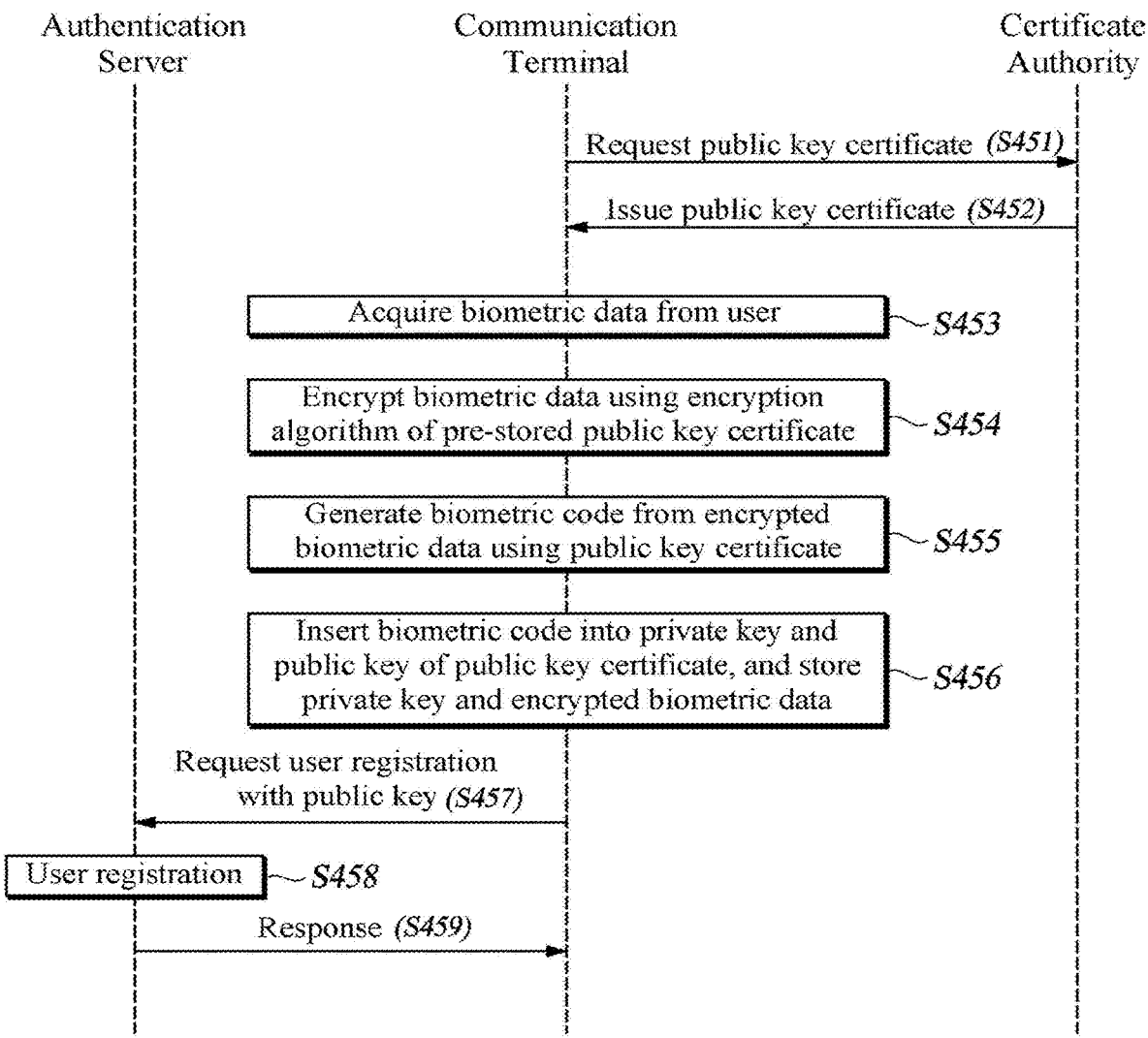
FIG. 4B is a flowchart of a user registration procedure according to some embodiments of the present disclosure.

FIG. 4B is a flowchart of a user registration procedure according to some embodiments of the present disclosure. The user registration procedure shown in FIG. 4B is suitable for a user authentication system having the configuration shown in FIG. 1B. Therefore, the communication terminal shown in FIG. 4B includes a personal communication terminal (e.g., a mobile phone, a wearable device such as a watch, glasses, a ring or the like, a tablet PC, a desktop computer, a set-up box, and the like), and should be understood to cover all devices that can communicate with a remote entity in the communication network.

The communication terminal requests the server of the certification authority (CA) for an issuance of a public key certificate to perform a user registration (Step S451). The server of the certification authority (CA) issues the public key certificate to the communication terminal (Step S452). Unlike the example shown in FIG. 4A, in some embodiments, the public key certificate is stored in the communication terminal in advance (e.g., at the time of manufacturing or distributing the communication terminal.

Subsequently, the communication terminal acquires biometric data of the user (Step S453). In acquisition of the biometric data, a built-in biometric sensor of the communication terminal or a biometric sensor of an external device connected to the communication terminal can be used.

The communication terminal then encrypts the biometric data of the user with the issued public key certificate (Step S454). That is, the communication terminal encrypts the biometric data based on an encryption algorithm defined in the public key certificate. The encrypted biometric data is stored in the communication terminal, to be used in the user authentication procedure later on.

The communication terminal codes or tokens the encrypted biometric data, and generates a code value (i.e., biometric code) (Step S455). A coding or tokening algorithm can be stored in the application of the communication terminal or defined in the public key certificate. In some embodiments, a message-digest algorithm defined in the public key certificate can be used as the coding or tokening algorithm.

Subsequently, the communication terminal generates a pair of keys (a public key and a private key) by inserting the generated biometric code in an extended validation (EV) domain of the public key certificate (Step S456). That is, the biometric code is inserted in the generated private key and public key. The private key is stored in the communication terminal to be used in the user authentication procedure later on. Although it is not shown in FIG. 4A, other additional code can be generated in a manner same as or similar to that for the biometric code, and added to the public key certificate as an additional authentication element.

Further, the communication terminal transmits the public key to the authentication server (or service providing server) to request the user registration (Step S457). The public key can be transmitted by using a virtual private network (VPN). The authentication server registers the user, and manages the public key in a separate safe DB (Steps S458 to S459).

Figures 5A, 5B:
FIGS. 5A and 5B are schematic diagrams of formats of public key certificates applied to a user authentication management system according to some embodiments of the present disclosure.

FIGS. 5A and 5B are schematic diagrams of formats of public key certificates applied to a ubiquitous identity management system according to some embodiments of the present disclosure.

The public key certificate (e.g., X.509 certificate that uses public key infrastructure (PKI) ITU-T Standard) is a sort of electronic guarantee that renders parties of transaction to trust each other when doing a business or a transaction on the Internet web. The public key certificate can be issued by a certification authority designated by a specific government or financial institute, a private certification authority, a product manufacturer, or a device-service providing institute.

An example format of the public key certificate without the user registration procedure is shown in FIG. 5A. The public key certificate contains version, serial number, signature algorithm, issuer, expiration date, public key, electronic signature of the issuer, and the like. It should be noted that the extended validation (EV) domain of the public key certificate without the user registration procedure is empty.

An example format of a public key certificate (public key/private key) generated by the public key certificate through the user registration procedure is shown in FIG. 5B. Unlike the example shown in FIG. 5A, the biometric code generated by coding the biometric data of the user is inserted in the extended validation (EV) domain of the public key certificate with the user registration procedure or the public key/private key generated therefrom. Various additional codes can be concatenated with the biometric code stored in the EV domain as an additional authentication element. Details on the additional codes are described with reference to FIG. 6.

In some embodiments of the present disclosure, public key certificates of various issuing agents and various formats can be used. Accordingly, the format of the public key certificate in which the biometric code is inserted is not limited to the examples shown in FIGS. 5A and 5B, and the extended domain of the public key certificate in which the biometric code is inserted is not limited to the EV domain.

FIG. 6 is a schematic diagram of an exemplary format of a code stored in an EV domain of a public key/private key shown in FIG. 5B and an exemplary format of authentication information transmitted from a smartcard.

As described above, only the biometric code generated by simply coding the biometric data of the user can be stored in the EV domain of the public key/private key (see FIG. 6($a$)), and a code configured by concatenating at least one of various additional codes with the biometric code can also be stored. For example, in some embodiments, an addition code (i.e., a device code) coded (tokened) from identity data of an IoT device of the user can be concatenated with the biometric code (see FIGS. 6($b$) and ($c$)). The identity data of the IoT device is unique identity data assigned to each IoT device at the time of manufacturing, distributing, or purchasing the device. The identity data of the IoT device contains device number, release information, serial number, electronic product code (EPC), universal product code (UPC), physically unclonable function (PUF), global shipment identification number (GSIN), MAC address, and the like. The identity data of the IoT device can be collected from a bar code and a QR code printed on the IoT device or an electronic element embedded in the IoT device. The usage of the device code is described later with reference to FIG. 8.

In some embodiments, an additional code coded from identity data of a smartcard or communication terminal that stores therein the public key certificate can be concatenated with the biometric code (see FIG. 6($d$)). The identity data of the smartcard or communication terminal that stores therein the public key certificate contains, for example, cryptographic hash functions value, physically unclonable function (PUF), payment card numbers, and the like.

In some embodiments, an additional code coded (or tokened) from unique identity data (e.g., social security number, personal identity data, or personal access number) assigned to the user from the government or a bank or information related to behavior characteristics of the user (e.g., keystroke or dynamic signature) can be concatenated with the biometric code (see FIGS. 6($e$) and ($f$)). The information related to the behavior characteristics of the user can be acquired through a touch screen of the smartcard or the communication terminal.

In some embodiments, an additional code coded (or tokened) from location information of the communication terminal (or smartcard) (e.g., global positioning system (GPS), group on earth observations (GEO) location) can be concatenated with the biometric code. This additional code can be applied to detect, protect, or prove an illegal transaction from stolen or lost information or device, by taking it into consideration as an additional authentication element whether or not a transaction is performed in a location apart from a normal transaction location (e.g., financial transaction, trust service activity, financial settlement, payment service, and charging).

In addition, a plurality of additional codes can be concatenated with the biometric code (see FIG. 6($g$) to ($i$)). FIG. 6($j$) instantiates a code obtained by concatenating a plurality of additional codes with the biometric code. In the concatenated code, the lengths of the biometric code and the additional codes can be the same as each other or different from each other.

An algorithm substantially same as that for generating the biometric code can be applied to an algorithm for generating the additional codes. Further, data encrypted in the process of generating the additional codes (e.g., encrypted dynamic signature) can be stored in the smartcard or the communication terminal together with the private key. The encrypted data stored in the smartcard or the communication terminal can be used as additional authentication means for a primary user authentication (based on the biometric matching) performed in the smartcard or the communication terminal.

FIG. 6($j$) instantiates a code contained in authentication information transmitted to the service providing server in the user authentication procedure. That is, the authentication information contains a code inserted in (concatenated with) the private key. Details on this aspect is described later with reference to FIG. 7A.

In particular, the code inserted in the private key/public key and the authentication information transmitted from the smartcard has various formats according to an application example and/or strength of the security, which is not limited to a few orders or combinations shown in FIG. 6. In addition, elements other than the authentication elements shown in FIG. 6 can be additionally used.

Figure 7A:
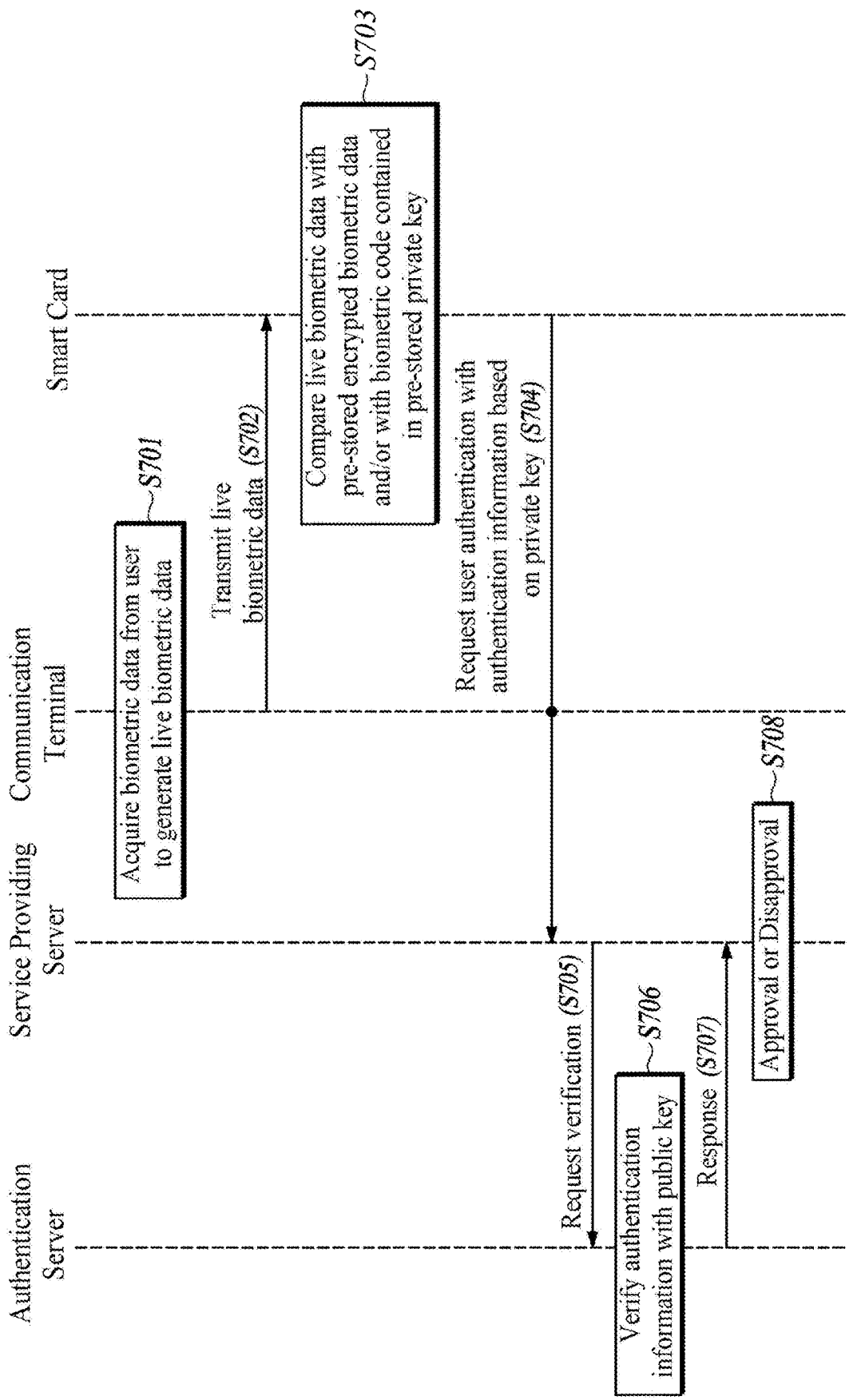
FIG. 7A is a flowchart of a user authentication procedure according to some embodiments of the present disclosure.

FIG. 7A is a flowchart of a user authentication procedure according to some embodiments of the present disclosure. The user authentication procedure shown in FIG. 7A is suitable for a user authentication system having the configuration shown in FIG. 1A.

Firstly, the communication terminal acquires the biometric data of the user, and transmits the acquired biometric data of the user to the smartcard (Steps S701 to S702). When acquiring the biometric data, a biometric sensor embedded in the communication terminal or an external biometric sensor connected to the communication terminal is used. Unlike the example shown in FIG. 7A, in some embodiments, the smartcard directly acquires the biometric data of the user by using the embedded biometric sensor.

The smartcard then compares the acquired biometric data with the encrypted biometric data stored in the smartcard and/or the biometric code inserted in the private key stored in the smartcard (Step S703). That is, the smartcard determines whether or not the acquired biometric data matches the encrypted biometric data and/or the biometric code stored in the smartcard.

When it is determined that the acquired biometric data matches the encrypted biometric data and the biometric code stored in the smartcard, the smartcard transmits the authentication information based on the private key to the service providing server via the communication terminal (Step S704). The authentication information can be transmitted by using a virtual private network (VPN). For example, the smartcard transmits a tunneling start signal for establishing a VPN with the service providing server to the communication terminal, and the communication terminal establishes a VPN between the service providing server and the smartcard in response to the tunneling start signal. The smartcard transmits the authentication information to the service providing server through the established VPN. The tunneling start signal contains a destination URL for establishing the VPN.

The service providing server requests the authentication server for a verification of the received authentication information (Step S705). The authentication server verifies the authentication information by using a registered public key. The service providing server completes the user authentication according to a verification result by the authentication server (Steps S706 to S708).

The authentication information transmitted to the service providing server is generated based on the code inserted in the private key stored in the smartcard (see FIG. 6(*a*) to (*i*)). For example, the authentication information contains the biometric code inserted in the EV domain of the public key certificate or concatenated code itself. In some embodiments, the authentication information further contains an OTP generated by a software-based OTP generator embedded in the smartcard, as well as the code inserted in the EV domain of the certificate (see FIG. 6(*j*)). In some embodiments, each of the authentication elements (biometric code, OTP, PUF, and the like) is transmitted in a separate form, and in some embodiments, each of the authentication elements is transmitted as a single piece of concatenated authentication data.

In some embodiments, the authentication information transmitted to the service providing server further contains unique information for proving an authentication action of the user. In some embodiments, the unique information is implemented in forms of a bar code, an e-signing of the user, and the like that enable the authentication of the user. Further, such bar code and e-signing can be provided in a form that can be outputted as a printed matter. The authentication action using the smartcard can enhance the reliability in a contract between parties by enabling a printing on a receipt or a statement in a form of a bar code or a signing. In some embodiments, the authentication information transmitted to the service providing server further contains time information on a time of transmitting the authentication information. In some embodiments, the authentication information transmitted to the service providing server further contains time information (i.e., time stamp) on a time of registering the user (e.g., time of generating the private key/public key or time of completing the user registration to the authentication server).

With this user authentication procedure, a user experience can be provided, compared to the conventional technology. For example, it is assumed that a connection is established to an Internet banking by using a smartcard. In this case, a conventional step of inputting a user identifier (ID) to access a service providing server that provides an Internet banking service is replaced with a step of establishing a communication tunnel based on biometric data of the user. Further, a conventional step of inputting a password of the user is replaced with a step of transmitting authentication information containing a code inserted in a private key through the established communication tunnel. Moreover, a conventional step of inputting a password of a public key certificate is replaced with a step of comparing the biometric data of the user with matching information contained in the public key certificate. That is, according to some embodiments of the present disclosure, the steps of inputting the certificate and the password required by the conventional service providing server can be omitted. In this manner, by performing the tunneling and authenticating process by using the smartcard, a single sing on using the biometric data can be achieved.

In addition, in a multi-factor authentication according to the conventional technology, all the authentication elements including ID, password, certificate password, OTP, and the like are managed respectively as individual authentication elements. On the contrary, according to some embodiments of the present disclosure, encrypted biometric data of the user, a biometric code, and an additional code are utilized as the authentication information in a concatenated form. Therefore, a multi-factor-authentication with more strengthened security than the one-stop, tap & play ubiquitous authentication can be achieved.

Figure 7B:
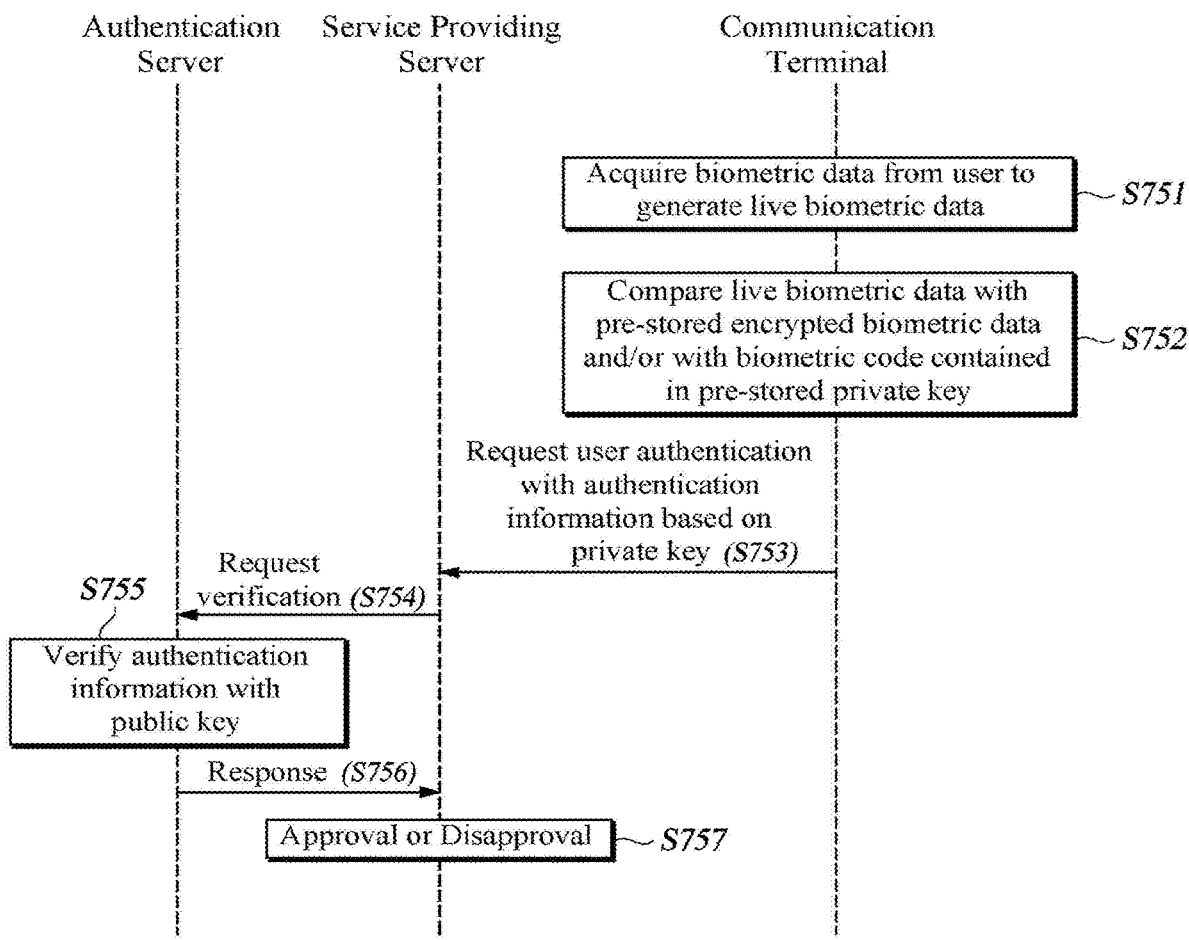
FIG. 7B is a flowchart of a user authentication procedure according to some embodiments of the present disclosure.

FIG. 7B is a flowchart of a user authentication procedure according to some embodiments of the present disclosure. The user authentication procedure shown in FIG. 7B is suitable for a user authentication system having the configuration shown in FIG. 1B.

Firstly, the communication terminal acquires the biometric data of the user (Step S751). When acquiring the biometric data, a biometric sensor embedded in the communication terminal or an external biometric sensor connected to the communication terminal is used.

The communication terminal then compares the acquired biometric data with the encrypted biometric data stored in the communication terminal and/or the biometric code inserted in the private key stored in the communication terminal (Step S752). That is, the communication terminal determines whether or not the acquired biometric data matches the encrypted biometric data and/or the biometric code stored in the communication terminal.

When it is determined that the acquired biometric data matches the encrypted biometric data and the biometric code stored in the communication terminal, the communication terminal transmits the authentication information based on the private key to the service providing server (Step S753).

The authentication information can be transmitted by using a virtual private network (VPN). For example, the communication terminal establishes a VPN with the service providing server, and the communication terminal transmits the authentication information to the service providing server through the established VPN.

The service providing server requests the authentication server for a verification of the received authentication information (Step S754). The authentication server verifies the authentication information by using a registered public key. The service providing server completes the user authentication according to a verification result by the authentication server (Steps S755 to S757).

In the above descriptions, a user authentication method based on the private key/public key in which the biometric code is inserted has been described. In some embodiments of the present disclosure described hereinafter, the biometric code of the user is associated with the identity data of the IoT device and used for managing and controlling the IoT device. Some embodiments related to the IoT device are described below with reference to FIGS. 8, 9, 10A, and 10B.

Figure 8A:
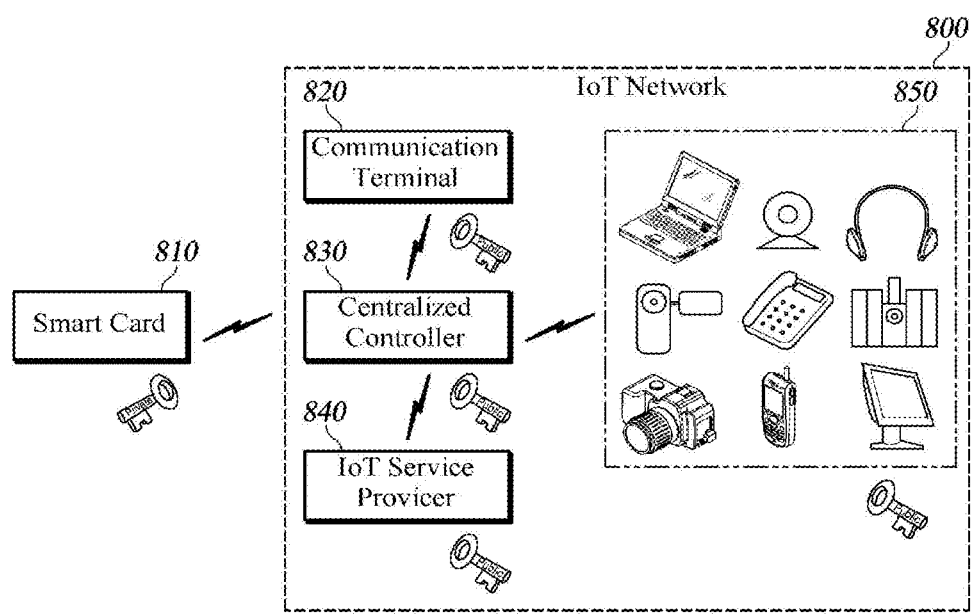
FIGS. 8A and 8B are schematic diagrams of a system configuration for managing a user of an IoT Device in the ubiquitous environment according to some embodiments of the present disclosure.
Figure 8B:
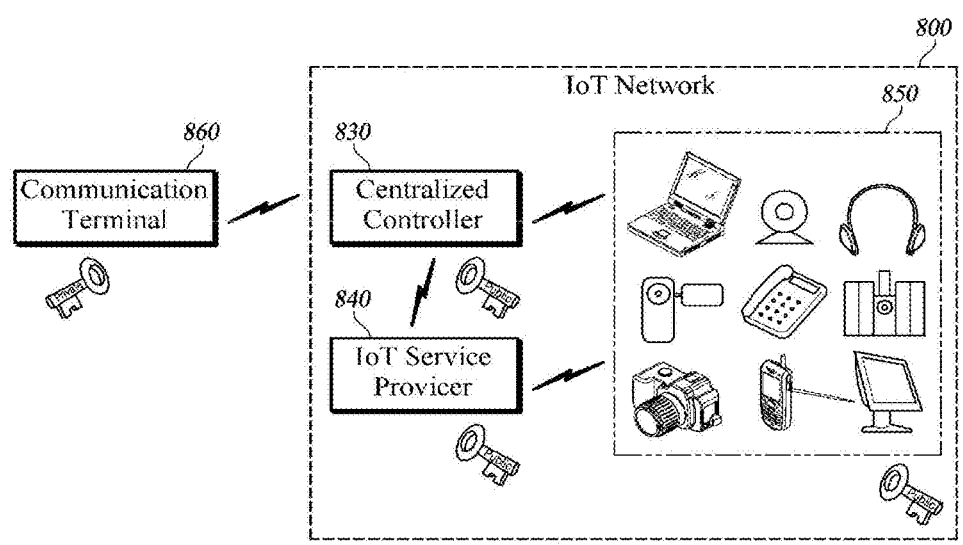

FIGS. 8A and 8B are schematic diagrams of a system configuration for managing a user of an IoT Device in the ubiquitous environment according to some embodiments of the present disclosure.

As shown in FIG. 8A, an IoT network 800 includes a plurality of IoT devices 850 each having a wired/wireless communication function. As described above, a smartcard 810 is configured to insert an additional code (i.e., device code) generated by coding the identity data of the IoT device of the user, as well as the biometric code, in generating the private key/public key from the public key certificate. This enables a relation of ownership between the user and the IoT device to be proven by associating the biometric code of the user with the identity data of the IoT device.

According to some embodiments of the present disclosure, the smartcard 810 generates the private key and the public key in which the biometric code and the device code are inserted, stores therein the private key, and transmits the public key to the related IoT device 850. The smartcard 810 transmits the authentication information based on the private key to the IoT device 850, and the IoT device 850 performs the user (owner) authentication by verifying the authentication information by using the public key.

In a network that covers a predetermined area such as a company, a building, a business sector, a home, a car, or the like, there may exist an IoT device (e.g., a set-top box, an access point, and the like in a home network) that manages (registers, monitors, and controls) various IoT devices connected to the network, i.e., a centralized controller 830. The centralized controller 830 is further configured to perform a role of a user interface, and has a further function of combining functions of the IoT devices 850 to provide an integrated service. In this case, the smartcard 810 is used for a registration of the IoT device 850 and a user (owner) authentication for a remote control of the IoT device 850 on the network, by transmitting a public key corresponding to each IoT device 850 to the centralized controller 830.

Further, the smartcard 810 is used for a registration of the IoT device 850 and a user (owner) authentication for a remote control of the IoT device 850 on the network, by transmitting a public key a server 840 of an IoT service provider who provides the IoT service.

Moreover, the smartcard 810 is used for a user (owner) authentication for registration, change, and transfer of an ownership of the IoT device by transmitting a public key to a server of a manufacturer/vendor of the IoT device 850.

In addition, the smartcard can be used as an integrated remote control for controlling each of the IoT devices 850 by transmitting public keys related to the IoT devices to a communication terminal 820 (e.g., mobile phone) and by the communication terminal 820 using the public keys of the IoT Devices. For example, the user performs a user authentication procedure (first authentication) at the communication terminal 820 by using the private key stored in the smartcard, and when the first authentication is successful, performs a control of an individual IoT device or the centralized controller 830 by using the public key stored in the communication terminal 820 without being linked with the smartcard.

In some embodiments of the present disclosure, a combination of specific pieces of biometric data can be used for resetting an IoT device or controlling an essential function of an IoT device. For example, the private key/public key in which code information generated from a combination of specific pieces of biometric data is inserted can be used for resetting an IoT device or controlling an essential function of an IoT device when the IoT device is in a state of malfunctioning, being uncontrollable, or the like.

The function of the smartcard 810 shown in FIG. 8A can be incorporated in the communication terminal 820. That is, according to some embodiments of the present disclosure, as shown in FIG. 8B, a communication terminal 860 generates the private key and the public key in which the biometric code and the device code are inserted. The communication terminal 860 stores the private key therein, and transmits the public key to the related IoT device 850, the server 840 of an IoT service provider, a server of a manufacturer/vendor of the IoT device, and the centralized controller 830.

The following description will explain the user (owner) registration and authentication procedure with the centralized controller for an IoT device with reference to FIGS. 9A to 10B. It should be understood that the same/similar procedure can be performed with servers of individual IoT devices and IoT service providers and the servers of IoT device manufacturers/sellers.

Figure 9A:
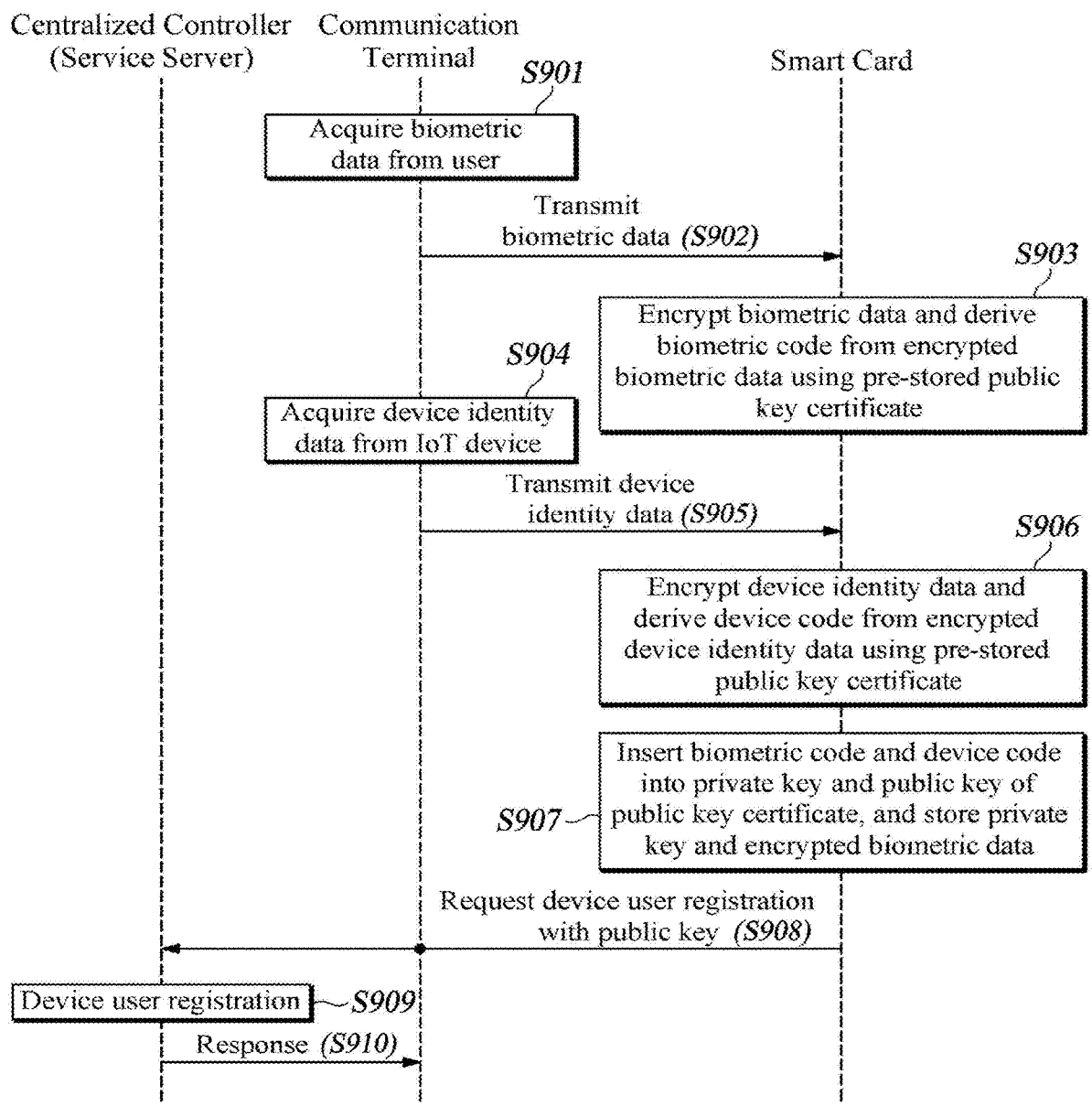
FIG. 9A is a flowchart of a device user registration procedure according to some embodiments of the present disclosure.

FIG. 9A is a flowchart of a device user registration procedure according to some embodiments of the present disclosure. The user registration procedure in FIG. 9A is suitable for the device user authentication system with the configuration as shown in FIG. 8A.

In an optional preliminary procedure, the smartcard 810 may use a private key with a pre-stored encrypted biometric data and/or biometric code inserted to perform the biometric authentication of the user in the device user registration procedure. In other words, the smartcard 810 may be configured to allow the device user registration procedure exclusively to registered users.

At first, the communication terminal 820 acquires the user's biometric data and transmits the acquired biometric data of the user to the smartcard 810 (S901-S902). Here, the acquisition of the biometric data may adopt a built-in biometric sensor of the communication terminal 820 or a biometric sensor provided in an external device connected to the communication terminal 820. Different from the illustration of FIG. 9A, other embodiments may have the smartcard 810 incorporate a biometric sensor to immediately obtain the biometric data of the user.

The smartcard 810 turns user biometric data into the pre-stored encrypted biometric data and encode (or tokenize) the encrypted biometric data to generate a biometric code (S903). The algorithms for the encryption and encoding (or tokenizing) may be built into the application of the smartcard 810 or they may be specified in the public key certificate.

Then, the smartcard 810 acquires device Identity data assigned to the IoT device via the communications terminal (S904-S905).

Here, the acquisition of the device identity data may adopt a built-in biometric sensor of the communication terminal 820 or a biometric sensor provided in an external device connected to the communication terminal 820. Different from the illustration of FIG. 9A, other embodiments may have the smartcard 810 incorporate a biometric sensor to immediately obtain the device identity data.

Next, in the same or similar method as described above for biometric code, the smartcard 810 generates a device code from the device identity data (S906). Specifically, the smartcard 810 encrypts the device identity data and encodes or tokenizes the encrypted device identity data to generate a device code.

Then, the smartcard 810 inserts the biometric code and the device code into an extended validation (EV) domain of the public key certificate to generate a pair of keys (public key and private key). In other words, the generated private key and public key have the biometric code and device code inserted therein. The inserted biometric code and device code in the private key and public key may be formed so that they are concatenated. The private key is stored in the smartcard 810 along with the encrypted biometric data (S907). Although not shown in FIG. 9A, other additional codes generated by the same or similar method as with the biometric code may be used for the generation of the private key and the public key. Such additional codes may be added as an additional authentication factor to the EV domain of the public key certificate.

The smartcard 810 then operates through the communications terminal to provide the public key to the centralized controller as well as to request a device user registration (S908). The transmission of the public key may adopt a virtual private network (VPN). The centralized controller 830 registers the device user and keeps the public key with a separate secured DB (S909-S910).

Figure 9B:
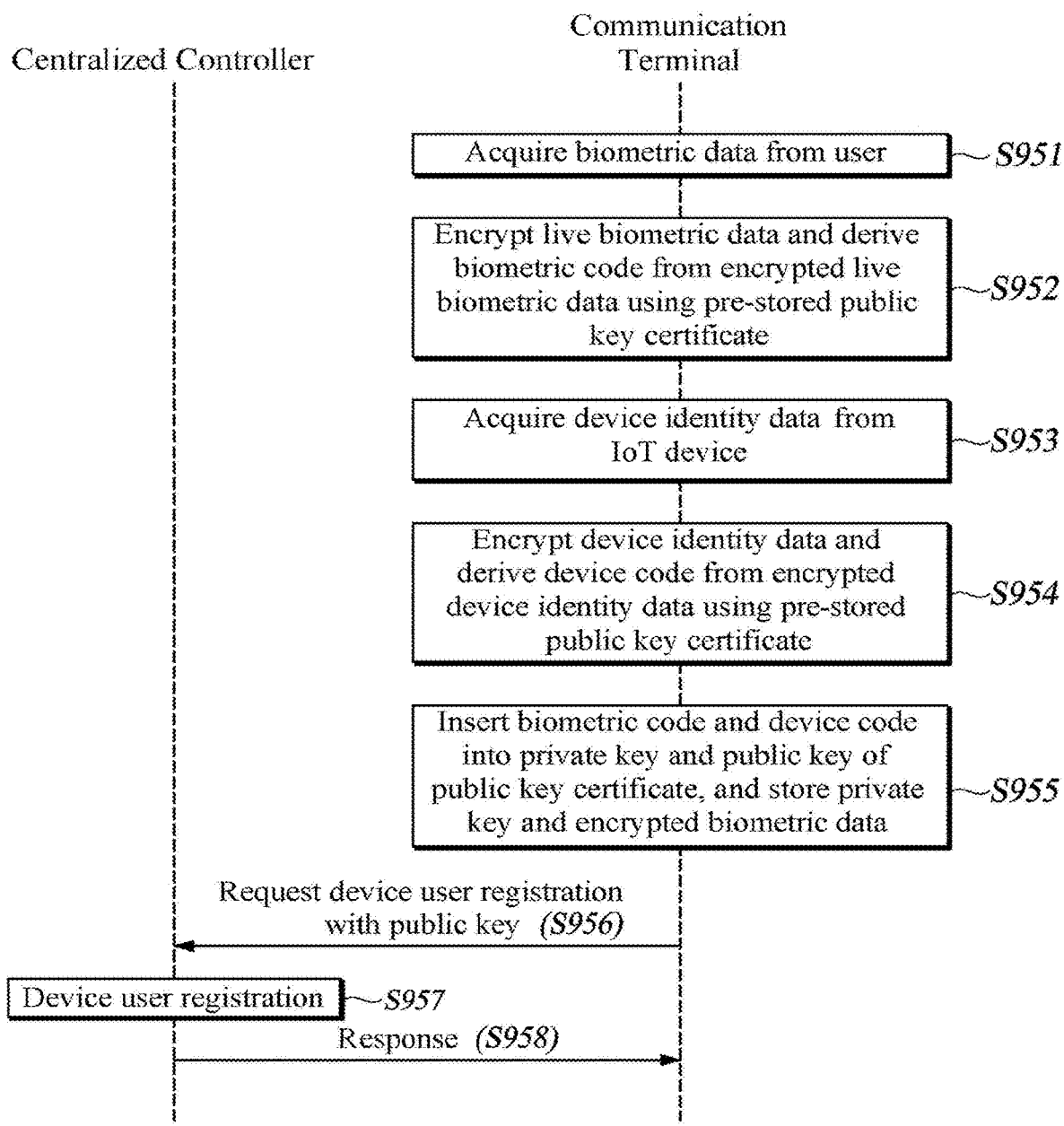
FIG. 9B is a flowchart of a device user registration procedure according to some embodiments of the present disclosure.

FIG. 9B is a flowchart of a device user registration procedure according to some embodiments of the present disclosure. The user registration procedure in FIG. 9B is suitable for the device user authentication system with the configuration as shown in FIG. 8B.

In an optional preliminary procedure, the communication terminal 860 may use a private key with a pre-stored encrypted biometric data and/or biometric code inserted to perform the biometric authentication of the user in the device user registration procedure. In other words, the communication terminal 860 may be configured to allow the device user registration procedure exclusively to registered users.

At first, the communication terminal 860 acquires the user's biometric data (S951-S952). Here, the acquisition of the biometric data may adopt a built-in biometric sensor of the communication terminal 860 or a biometric sensor provided in an external device connected to the communication terminal 860.

The communication terminal 860 turns user biometric data into the pre-stored encrypted biometric data and encode (or tokenize) the encrypted biometric data to generate a biometric code (S953). The algorithms for the encryption and encoding (or tokenizing) may be built into the smartcard application or they may be specified in the public key certificate.

Then, the communication terminal 860 acquires device Identity data assigned to the IoT device (S954-S955). Here, the acquisition of the device identity data may adopt a built-in biometric sensor of the communication terminal or a biometric sensor provided in an external device connected to the communication terminal.

Next, in the same or similar method as described above for biometric code, the communication terminal 860 generates a device code from the device identity data (S956). Specifically, the communication terminal 860 encrypts the device identity data and encodes or tokenizes the encrypted device identity data to generate a device code.

Then, the communication terminal 860 inserts the biometric code and the device code into the EV domain of the public key certificate to generate a pair of keys (public key and private key). In other words, the generated private key and public key have the biometric code and device code inserted therein. The inserted biometric code and device code in the private key and public key may be formed so that they are concatenated. The private key is stored in the communication terminal 860 along with the encrypted biometric data (S957). Although not shown in FIG. 9B, other additional codes generated by the same or similar method as with the biometric code may be used for the generation of the private key and the public key. Such additional codes may be added as an additional authentication factor to the EV domain of the public key certificate.

The communication terminal 860 then operates through the communications terminal to provide the public key to the centralized controller as well as to request a device user registration (S958). The transmission of the public key may adopt a VPN. The centralized controller 830 registers the device user and keeps the public key with a separate secured DB (S959-S960).

The device user registration procedure in FIGS. 9A and 9B has been illustrated as generating a new key pair (private key, public key) regardless of the private key previously generated and stored in the smartcard 810 or the communication terminal 860. However, in other embodiments, the new key pair (private key, public key) may be generated by way of additively inserting a device code to the pre-stored private key.

Figure 10A:
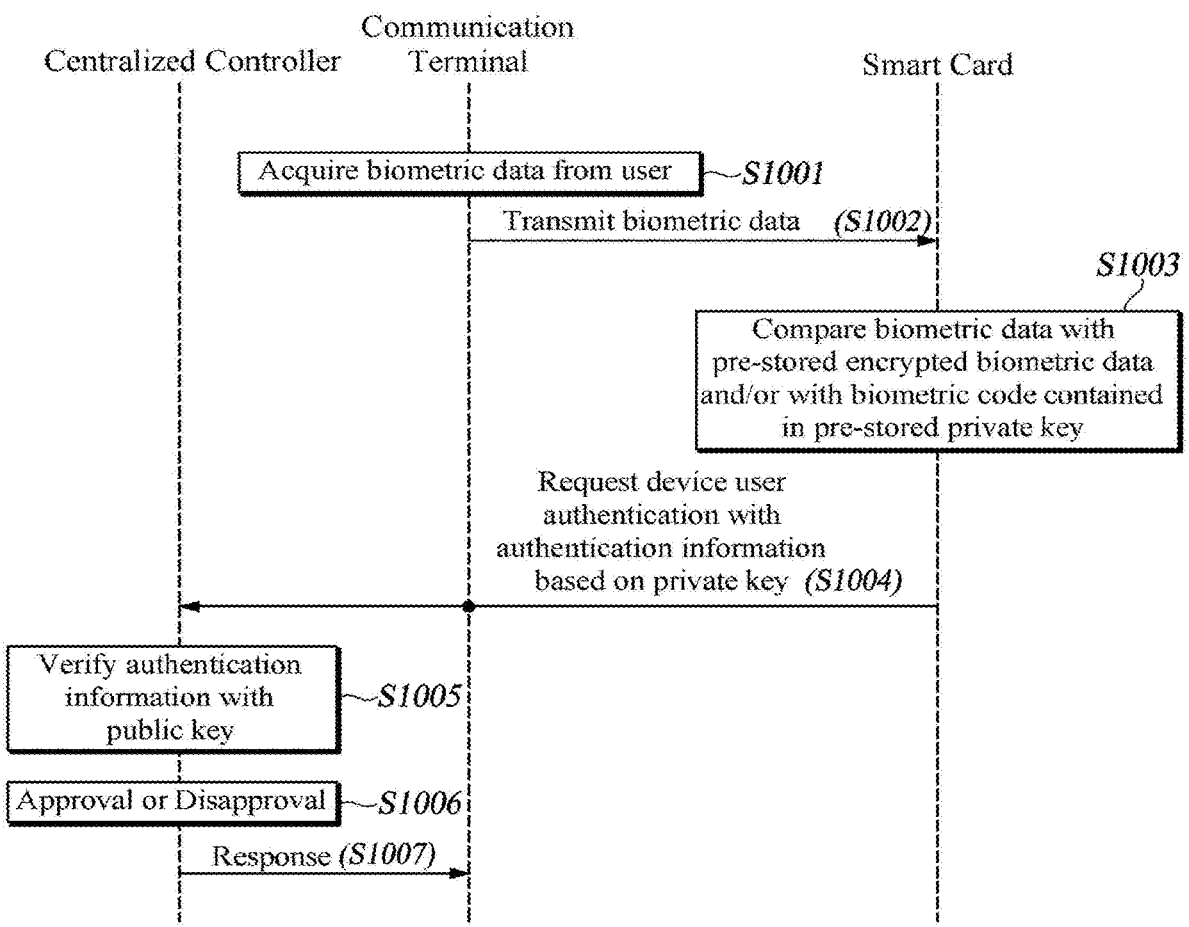
FIG. 10A is a flowchart of a device user authentication procedure according to some embodiments of the present disclosure.

FIG. 10A is a flowchart of a device user authentication procedure according to some embodiments of the present disclosure. The user registration procedure in FIG. 10A is suitable for the device user authentication system with the configuration as shown in FIG. 8A.

At first, the communication terminal 820 acquires the user's biometric data and transmits the acquired biometric data of the user to the smartcard 810 (S1001-S1002). Here, the acquisition of the biometric data may adopt a built-in biometric sensor of the communication terminal 820 or an external biometric sensor connected to the communication terminal 820. Different from the illustration of FIG. 10A, other embodiments may have the smartcard 810 incorporate a biometric sensor to immediately obtain the biometric data of the user.

Then, the smartcard 810 compares the acquired biometric data with the pre-stored encrypted biometric data in the smartcard 810 and/or the contained biometric code in the pre-stored private key in the smartcard 810 (S1003). In other words, the smartcard 810 determines whether the acquired live biometric information matches the pre-stored encrypted biometric data and/or the biometric code.

If the acquired live biometric information matches the pre-stored encrypted biometric data and/or the biometric code, the smartcard 810 transmits the authentication information based on the private key to the centralized controller 830 (S1004). The transmission of the authentication information may adopt a VPN. For example, the smartcard 810 transmits a tunneling start signal for opening a VPN with the centralized controller 830 to the communication terminal 820 which in turn opens the VPN between the centralized controller 830 and the smartcard 810 which then sends the authentication information through the open VPN to the centralized controller 830.

The centralized controller 830 verifies the received authentication information by using the already registered public key and completes the device user authentication (S1005-1007) depending on the outcome of the verification. In some embodiments, the centralized controller 830 may request the IoT service providing server 840 or authentication server (not shown) to verify the authentication information received from the smartcard 810 to complete the device user authentication according to the verification result.

Figure 10B:
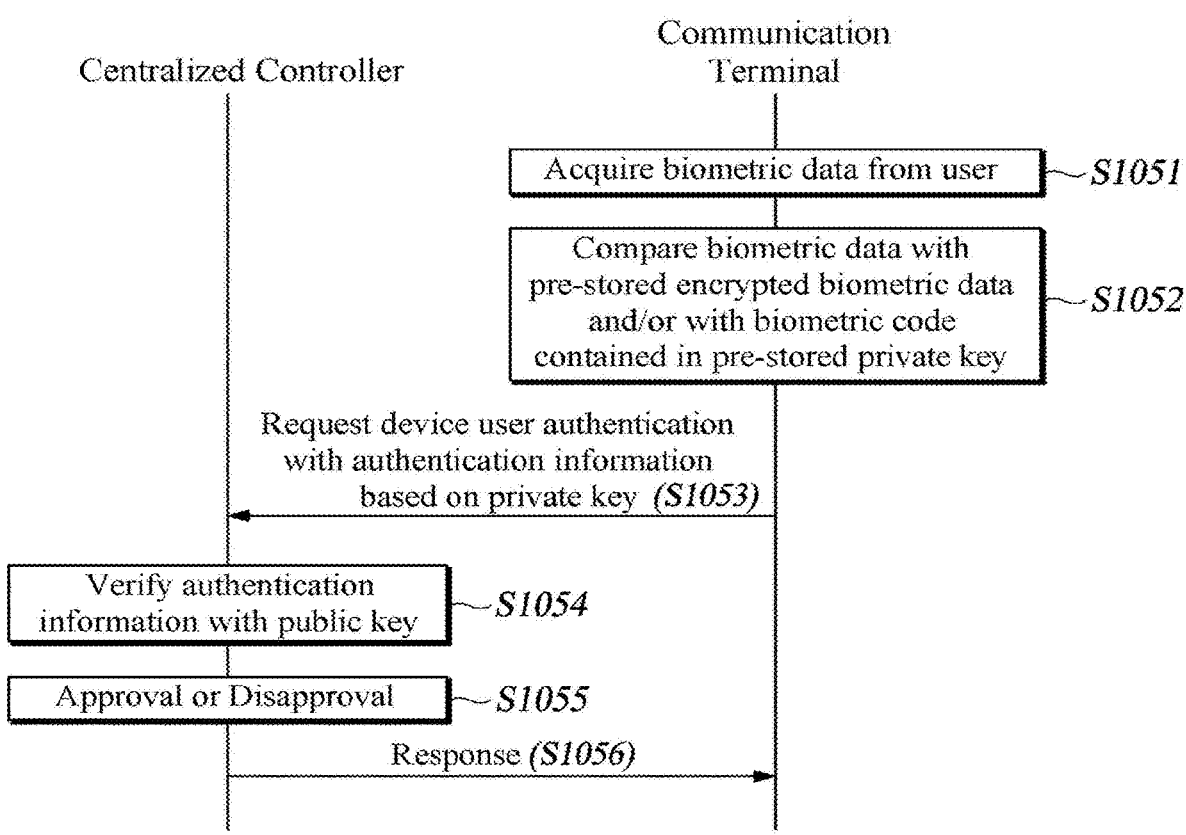
FIG. 10B is a flowchart of a device user authentication procedure according to some embodiments of the present disclosure.

FIG. 10B is a flowchart of a device user authentication procedure according to some embodiments of the present disclosure. The user registration procedure in FIG. 10B is suitable for the device user authentication system with the configuration as shown in FIG. 8B.

At first, the communication terminal 860 acquires the user's biometric data (S1051-S1052). Here, the acquisition of the biometric data may adopt a built-in biometric sensor of the communication terminal 860 or a biometric sensor provided in an external device connected to the communication terminal 860.

Then, the communication terminal 860 compares the acquired biometric data with the pre-stored encrypted biometric data and/or the contained biometric code in the pre-stored private key (S1053). In other words, the communication terminal 860 determines whether the acquired live biometric information matches the pre-stored encrypted biometric data and/or the biometric code.

If the acquired live biometric information matches the pre-stored encrypted biometric data and/or the biometric code, the communication terminal 860 transmits the authentication information based on the private key to the centralized controller 830 (S1054). The transmission of the authentication information may adopt a VPN. For example, the communication terminal 860 transmits sends the authentication information through the open VPN to the centralized controller 830.

The centralized controller 830 verifies the received authentication information by using the already registered public key and completes the device user authentication (S1055-1057) depending on the outcome of the verification. In some embodiments, the centralized controller 830 may request the IoT service providing server 840 or authentication server (not shown) to verify the authentication information to complete the device user authentication according to the verification result.

Figure 11:
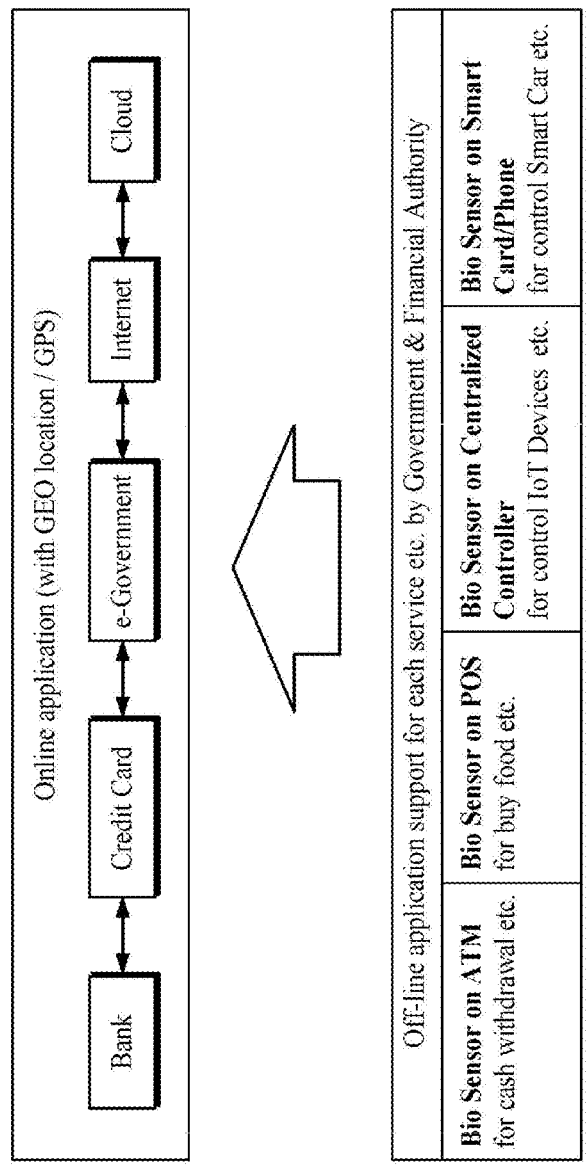
FIG. 11 is a schematic diagram for illustrating a concept of a ubiquitous authentication system according to online/offline environment.

FIG. 11 is a schematic diagram for illustrating a concept of a ubiquitous authentication system according to online/offline environment.

All of ubiquitous authentication is dealing with authentication online, but the environment of developing countries does not provide all of the region with the Internet or a minimum of communication means. Further, earthquake/typhoon/flood/power disruption/heavy snow or such disasters may temporarily cause faulty online environment. To overcome these temporary/nontemporary constraints, it is necessary to properly complement the authentication system based on the online environment. For example, service terminals (or public terminal) such as ATM, POS and kiosk are better to allow the least cash withdrawal or payment even in the offline environment. As another example, even if a smart home network temporarily falls in an offline environment, there is a need to allow limited access to the centralized controller which provides an integrated management of in-home IoT devices. As yet another example, smartcar has a network of a plurality of sensors or IoT devices for functions such as unmanned vehicle operation, automatic driving, location informing and navigation. Even when such a smartcar goes offline, there is a need to perform an authorization in a limited range relative to the online environment.

The present disclosure in some embodiments provides a user authentication method that can provide some limited service (e.g., withdrawal of cash, payment for the purchase of food, access control, etc.) with limited electric power in the off-line environment by utilizing some of various authentication means such as the biometric data of the online state (biometric code), PKI, OTP, etc. According to one embodiment of the present disclosure, a service providing server provides the user after the user registration with certain credential or token that can be used to authenticate the user in the offline environment. For example, the credential may be a modified public key that is derived from the public key that is possessed by the user in the user registration procedure or received from the smartcard or the communication terminal.

Figure 12:
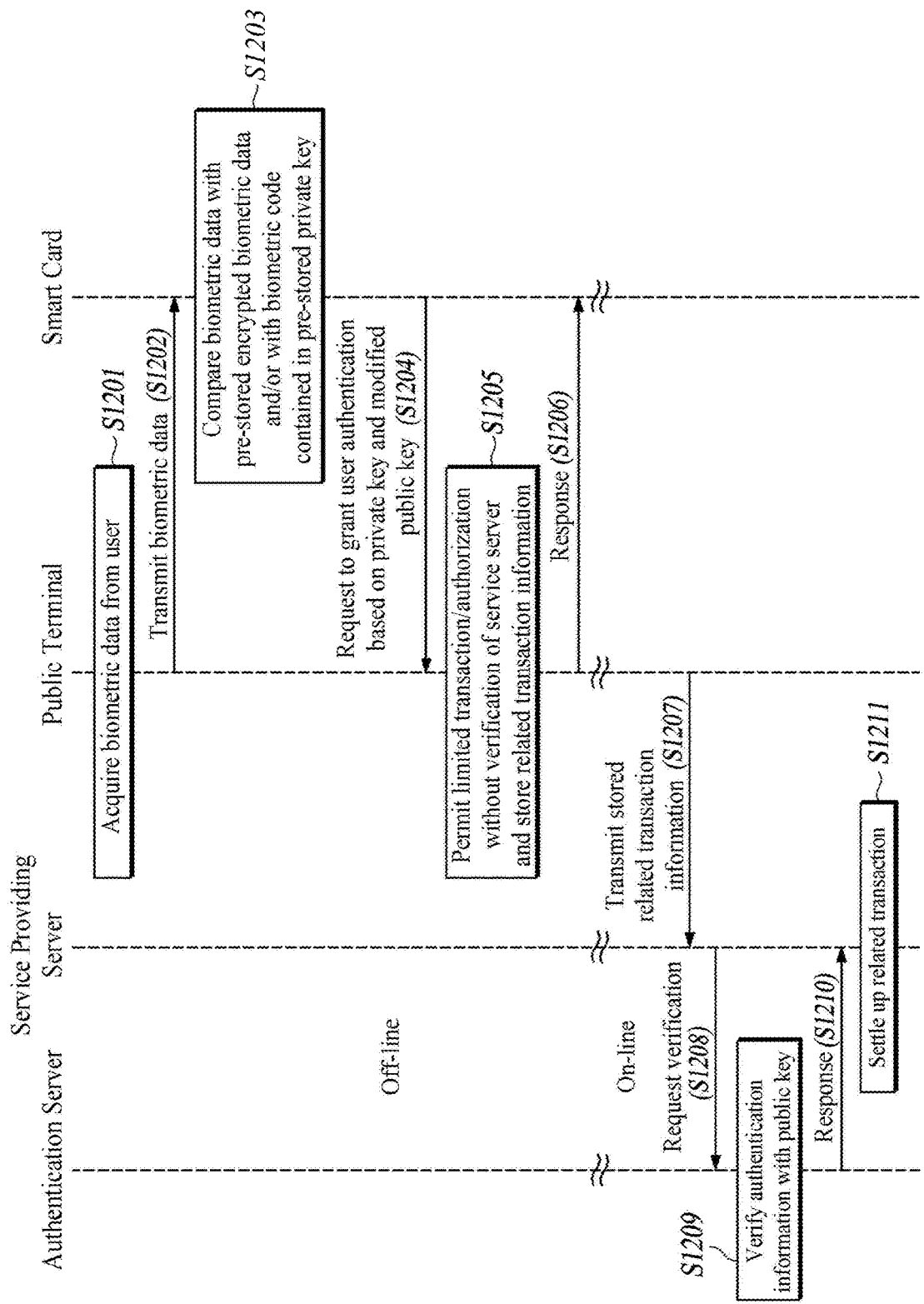
FIG. 12 is a flowchart of a user authentication procedure in an offline environment according to some embodiments of the present disclosure.

FIG. 12 is a flowchart of a user authentication procedure in an offline environment according to some embodiments of the present disclosure. FIG. 11 is on the assumption of using a smartcard, but substantially the same procedure applies when using the communication terminal (e.g., smartphone) instead of the smartcard.

First, in off-line environment, public terminal (e.g., ATM, POS, Centralized Controller etc.) acquires user's biometric data and transfers the acquired biometric data to a smartcard (S1201-S1202). Here, the acquisition of the biometric data may adopt a built-in biometric sensor of the public terminal or an external biometric sensor connected to the public terminal. Different from the illustration of FIG. 12, other embodiments may have the smartcard incorporate a biometric sensor to immediately obtain the biometric data of the user.

Then, the smartcard compares the acquired biometric data with the pre-stored encrypted biometric data in the smartcard and/or the contained biometric code in the pre-stored private key in the smartcard (S1203). In other words, the smartcard determines whether the acquired live biometric information matches the pre-stored encrypted biometric data and/or the biometric code.

If the acquired live biometric information matches the pre-stored encrypted biometric data and/or the biometric code, the smartcard transmits, to the centralized controller, the authentication information based on the private key and the authentication information based on a modified public key provided in advance by the service providing server (S1204).

The public terminal in offline environment performs an authorization in more limited range relative to online environment without requesting the service providing server to verify the received authentication information. In other words, a certain limited range of services/transaction/access is allowed. In some embodiments, the public terminal can also verify whether verification codes inserted into the received authenticated information have been generated based on the same public key certificate.

The relevant transaction information (i.e., the transaction history or service provision history and the relevant authentication information) is stored in a secure area including a secure element of a smartcard and/or public terminal for future settlement to be performed online (S1205). In addition, the encrypted transaction information can be stored by using the private key/public key.

Back to the online environment, the public terminal transmits the stored transaction information to the service providing server (S1206). The service providing server verifies the authentication information contained in the transaction information via the authentication server, and settles the transaction history which is included in the transaction information based on the verification result (S1207-1209).

FIG. 13 is a table of an exemplary application field to which the embodiments of the present disclosure can be applied.

The user authentication may adopt compositive authentication methods, but it is contemplated to employ a smartcard gradually integrated with information of a variety of applications such as credit card+national electronic ID+electronic passport+driver's license.

As illustrated in the table of FIG. 13, the applicable applications of the embodiments of the present disclosure may be classified into four general sections.

A finance and identification section represents the user authentication associated with financial transactions and a variety of identification in the online/offline status. For application to those areas, smartcard (or communication terminal) can further hold various information on credit card/debit card/cyber money/E-wallet/digital coupon/financial data/cryptographic hash functions value/national ID/driver license/medical information/patients/e-Voting/pension/unique identity data, Etc. Some of the above information may be in the form of embedded data in the EV domain of the public key certificate for the relevant service. For example, the EV domain of the public key certificate issued for use in the application of national electronic ID may have identity data that is embedded unique to an individual (e.g., resident registration number, social security number, etc.). In addition, some information may be stored in advance in the same region as the public key certificate for the relevant service.

A physical access section is an application area for the purpose of, for example, visitor access control where a smartcard (or communication terminal) may serve as an ID badge or access card. The private key/public key for use in this application area may have a location information (e.g., GEO, GIS, GPS Information) added or a code added from encoding (or tokenizing) thereof. The additional location information or code can be utilized as an additional authentication factor for finding out falsification, forged access, etc.

A single sign-on section (SSO Section; integrated authentication) is the authentication function that allows use of the resources on multiple independent software system in a single process of user authentication. According to some embodiments of the present disclosure, an authentication procedure is performed based on biological matching and the private key/public key with a biometric code inserted to save the input process of the certificate and password requested by the service providing server 130, which allows the implementation of a biometric single sign-on. According to other embodiments of the present disclosure, a user may own or possess communication terminals, store in user's own cloud a private key generated by the first terminal (e.g., smartphone), and download the corresponding private key for use in a second terminal (e.g., tablet PC, smart watch). This obviates the need for generating private keys for the same purpose at the respective communication terminals, and a private key generated in a single communication terminal can be shared by a plurality of communication terminals which the user owns or possesses.

The device user authentication section is an application area for supporting a user authentication for registering an IoT device or an access control to the IoT device. The public key/private key used in such an application area is further inserted with a device code including coded identity data of the IoT device, as well as the biometric code. In addition, the public key is transmitted to each IoT device, a centralized controller, an IoT service server, an IoT vender server, and the like, and used for a device user authentication, a remote control, and the like.

Figure 14:
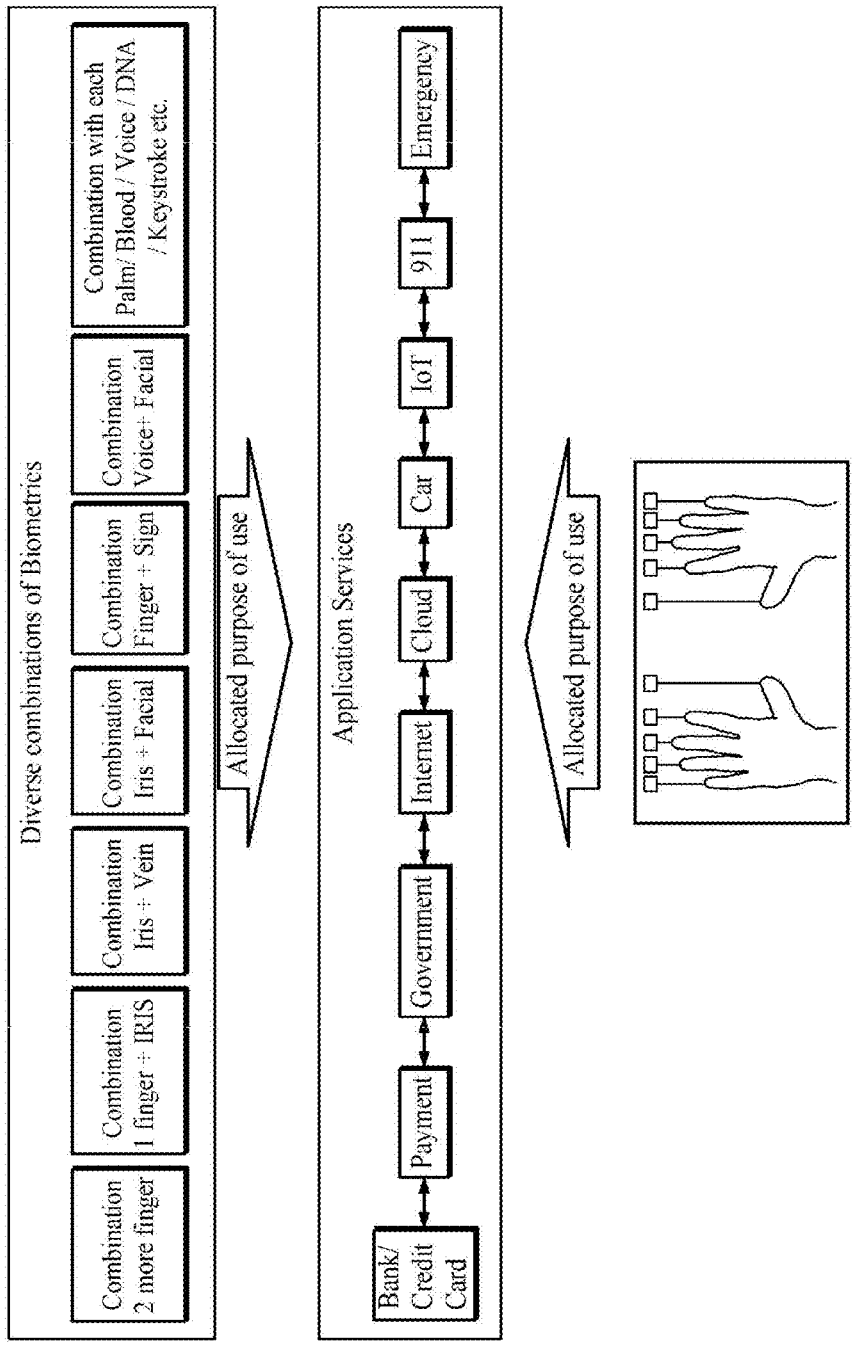
FIG. 14 is a schematic diagram for illustrating a case where various pieces of biometric data or a combination thereof can be classified and used by various usages.

FIG. 14 is a schematic diagram for illustrating a case where various pieces of biometric data or a combination thereof can be classified and used by various usages.

As described above, in some embodiments of the present disclosure, a plurality of pieces of different biometric data and/or a combination of the pieces of different biometric data of the user can be used. For example, FIG. 14 instantiates a case of using different pieces of biometric data of the same type, where 10 pieces of finger print information are respectively used for different usages from each other. That is, in some embodiments of the present disclosure, pieces of biometric data of the same type are respectively coded and inserted in a single private key/public key, or a separate private key/public key is generated for each piece of biometric data.

Further, FIG. 14 instantiates a case where various combinations of pieces of biometric data are respectively used for different usages from each other. That is, in some embodiments of the present disclosure, the pieces of biometric data are respectively coded and inserted in a single private key/public key, and a separate pair of keys (private key/public key) can be generated for each of the combinations. In addition, an input order of the pieces of biometric data can be given to the same combination of pieces of biometric data.

In the descriptions of various embodiments of the present disclosure, it is assumed that the encrypted biometric data used for the biometric matching, as well as the private key in which the biometric code is inserted, is stored in the smartcard or the communication terminal across the overall specification. However, it is not preferred that such features be treated as the essential constituent elements in the all embodiments of the present disclosure. For example, in some embodiments, the encrypted biometric data is not stored in the smartcard or the communication terminal, such that only the biometric code inserted in the private key is used for the biometric matching. Further, in some embodiments, a Hash value of biometric data of an individual managed by a government agency (e.g., administration, investigation agency, immigration office, and the like) can be used. The Hash value can be stored in advance in a predetermined area of the smartcard, and can be inserted in an EV domain of the public key certificate issued by a related authority. Moreover, the encrypted biometric data used for the biometric matching can be biometric data that is encrypted by an encryption algorithm defined in the public key certificate, and can be biometric data encrypted by using the private key in which the biometric code is inserted. In addition, the biometric data encrypted by using the public key certificate can be stored with the private key in a state in which the encrypted biometric data is further encrypted with the private key.

Although exemplary embodiments of the present disclosure have been described for illustrative purposes, those skilled in the art will appreciate that various modifications, additions and substitutions are possible, without departing from the idea and scope of the claimed disclosure. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand the scope of the claimed disclosure is not limited by the explicitly described above embodiments but by the claims and equivalents thereof.

What is claimed is:

1. A method of registering a person as an authorized user of a portable device, the method comprising:
    acquiring, by a portable device, biometric data or a combination of pieces of biometric data of a person;
    encrypting, by the portable device, the acquired biometric data or the combination of pieces of biometric data of the person;
    generating, by the portable device, a code from the encrypted biometric data or the combination of pieces of biometric data of the person;
    inserting, by the portable device, the code in an extension field of a public key certificate stored in the portable device;
    acquiring, by the portable device, unique identity data of an Internet of Things (IoT) device;
    encrypting, by the portable device, the acquired unique identity data of the IoT device,
    generating, by the portable device, an IoT device code from the encrypted unique identity data of the IoT device;
    inserting, by the portable device, the IoT device code in the extension field of the public key certificate;
    generating, by the portable device, a private key and a public key that corresponds to the private key, based on the public key certificate, wherein the private key contains the code and the IoT device code; and
    transmitting, by the portable device, the public key to a remote entity that is in communication with the portable device, thereby enabling the remote entity to register the person as an authorized user of the portable device,
    wherein the extension field of the public key certificate further contains a code associated with identification information of the person.

2. The method according to claim 1, wherein the code associated with identification information of the person comprises a code associated with a resident registration number of the person, a code associated with a drivers license of the person, a code associated with a medical card of the person, a code associated with a social security number of the person, a code associated with a passport of the person, a code associated with voter registration of the person, or a code associated with any combination thereof.

3. The method according to claim 1, wherein the extension field of the public key certificate further contains information on a uniform resource locator (URL) of the remote entity.

4. The method according to claim 1, wherein the extension field of the public key certificate further contains a code associated with electronic money of the person, a code associated with an electronic wallet of the person, a code associated with a cryptographic hash function that represents a value or an address of digital currency belonging to the person, a code associated with a coupon belonging to the person, or a code associated with any combination thereof.

5. The method according to claim 1, further comprising:
    modifying, by the remote entity, the public key to generate a modified public key configured to be used in case that the remote entity is disconnected from a service providing server; and
    transmitting, by the remote entity, the modified public key to the portable device.

6. The method according to claim 1, wherein the remote entity is implemented as a central controller for an Internet of Things (IoT) device, a server of an IoT service provider, a server of an IoT device vender, or any combination thereof.

7. The method according to claim 1, wherein the portable device is implemented as a smartcard, a dongle, a watch, glasses, a ring, or a mobile communication terminal.

8. A portable device comprising:
    a sensor that is disposed in the portable device and is configured to acquire biometric data or a combination of pieces of biometric data of a person;
    a memory that is disposed in the portable device and is configured to store a public key certificate; and
    a processor that is disposed in the portable device and is configured to cause the portable device to:
        encrypt the acquired biometric data or the combination of pieces of biometric data of the person;
        generate a code from the encrypted biometric data or the combination of pieces of biometric data of the person;
        insert the code in an extension field of the public key certificate;
        acquire unique identity data of an Internet of Things (IoT) device;
        encrypt the acquired unique identity data of the IoT device;
        generate an IoT device code from the encrypted unique identity data of the IoT device;
        insert the IoT device code in the extension field of the public key certificate;
        generate a private key and a public key that corresponds to the private key, based on the public key certificate, wherein the private key contains the code and the IoT device code; and
        transmit the public key to a remote entity that is in communication with the portable device, thereby enabling the remote entity to register the person as an authorized user of the portable device,
    wherein the extension field of the public key certificate further contains a code associated with identification information of the person.

9. The portable device according to claim 8, wherein the code associated with identification information of the person comprises a code associated with a resident registration number of the person, a code associated with a driver's license of the person, a code associated with a medical card of the person, a code associated with a social security number of the person, a code associated with a passport of the person, a code associated with voter registration of the person, or a code associated with any combination thereof.

10. The portable device according to claim 8, wherein the extension field of the public key certificate further contains information on a uniform resource locator (URL) of the remote entity.

11. The portable device according to claim 8, wherein the extension field of the public key certificate further contains a code associated with electronic money of the person, a code associated with an electronic wallet of the person, a code associated with a cryptographic hash function that represents a value or an address of digital currency belonging to the person, a code associated with a coupon belonging to the person, or a code associated with any combination thereof.

12. The portable device according to claim 8, wherein the memory of the portable device further stores a modified key generated by the remote entity, and
wherein the modified key is generated by modifying the public key and configured to be used in case that the remote entity is disconnected from a service providing server.

13. The portable device according to claim 8, wherein the remote entity is implemented as a central controller for an Internet of Things (IoT) device, a server of an IoT service provider, a server of an IoT device vender, or any combination thereof.

14. The portable device according to claim 8, wherein the portable device is implemented as a smartcard, a dongle, a watch, glasses, a ring, or a mobile communication terminal.

15. A method of registering a person as an authorized user of an IoT device, the method comprising:
acquiring, by the portable device, unique identity data of an Internet of Things (IoT) device;
generating, by the portable device, an IoT device code from the acquired unique identity data of the IoT device;
inserting, by the portable device, the IoT device code in an extension field of a public key certificate stored in the portable device;
generating, by the portable device, a private key and a public key that corresponds to the private key, based on the public key certificate, wherein the private key contains the IoT device code; and
transmitting, by the portable device, the public key to a remote entity that is in communication with the portable device, thereby enabling the remote entity to register the person as an authorized user of the IoT device,
wherein the extension field of the public key certificate further contains a code associated with identification information of the person.

16. The method according to claim 15, wherein the code associated with identification information of the person comprises a code associated with a resident registration number of the person, a code associated with a drivers license of the person, a code associated with a medical card of the person, a code associated with a social security number of the person, a code associated with a passport of the person, a code associated with voter registration of the person, or a code associated with any combination thereof.

17. The method according to claim 15, further comprising:
encrypting, by the portable device, the acquired unique identity data of the IoT device,
wherein the IoT device code is generated from the encrypted unique identity data of the IoT device.

18. The method according to claim 15, wherein the extension field of the public key certificate further contains information on a uniform resource locator (URL) of the remote entity.

19. The method according to claim 15, wherein the extension field of the public key certificate further contains a code associated with electronic money of the person, a code associated with an electronic wallet of the person, a code associated with a cryptographic hash function that represents a value or an address of digital currency belonging to the person, a code associated with a coupon belonging to the person, or a code associated with any combination thereof.

20. The method according to claim 15, further comprising:
modifying, by the remote entity, the public key to generate a modified public key configured to be used in case that the remote entity is disconnected from a service providing server; and
transmitting, by the remote entity, the modified public key to the portable device.

21. The method according to claim 15, wherein the remote entity is implemented as a central controller for an Internet of Things (IoT) device, a server of an IoT service provider, a server of an IoT device vender, or any combination thereof.

* * * * *